US006422704B1

(12) United States Patent
Gyoten et al.

(10) Patent No.: US 6,422,704 B1
(45) Date of Patent: Jul. 23, 2002

(54) PROJECTOR THAT AUTOMATICALLY ADJUSTS THE PROJECTION PARAMETERS

(75) Inventors: Takaaki Gyoten, Kobe; Masahiro Kawashima, Ibaraki; Syunsuke Kimura, Nishinomiya, all of (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/344,187

(22) Filed: Jun. 24, 1999

(30) Foreign Application Priority Data

| Jun. 26, 1998 | (JP) | 10-180130 |
| Jul. 14, 1998 | (JP) | 10-198485 |
| Jul. 14, 1998 | (JP) | 10-198486 |

(51) Int. Cl.⁷ .............................................. G03D 21/14
(52) U.S. Cl. .................... 353/122; 353/101; 348/745
(58) Field of Search .................... 353/101.69, 122; 348/745, 806; 345/207, 214

(56) References Cited

U.S. PATENT DOCUMENTS 5,276,523 A * 1/1994 Kurematsu et al. ......... 353/101
5,400,093 A * 3/1995 Timmers ..................... 353/101
5,479,225 A * 12/1995 Kuga ......................... 353/101

FOREIGN PATENT DOCUMENTS

JP          5197014          8/1993

* cited by examiner

Primary Examiner—William Dowling
(74) Attorney, Agent, or Firm—Price and Gess

(57) ABSTRACT

A projector 100 projects an image onto a screen 200 by having light from a light source 111 pass through light valves 108~110 corresponding to RGB colors and a projection lens 101. A special pattern is displayed on the light valves 108~110 so that an image of the special pattern is projected onto the screen 200. The projector includes a half mirror 112 that directs light, which has been reflected back off this image on the screen 200 and back through the light valves 108~110, toward the collective lens 113, and a light detecting element 114 for detecting the intensity of the light collected by the collective lens 113. Based on the detected intensity, the microcomputer 116 automatically adjusts the projection parameters of the projector 100.

19 Claims, 31 Drawing Sheets

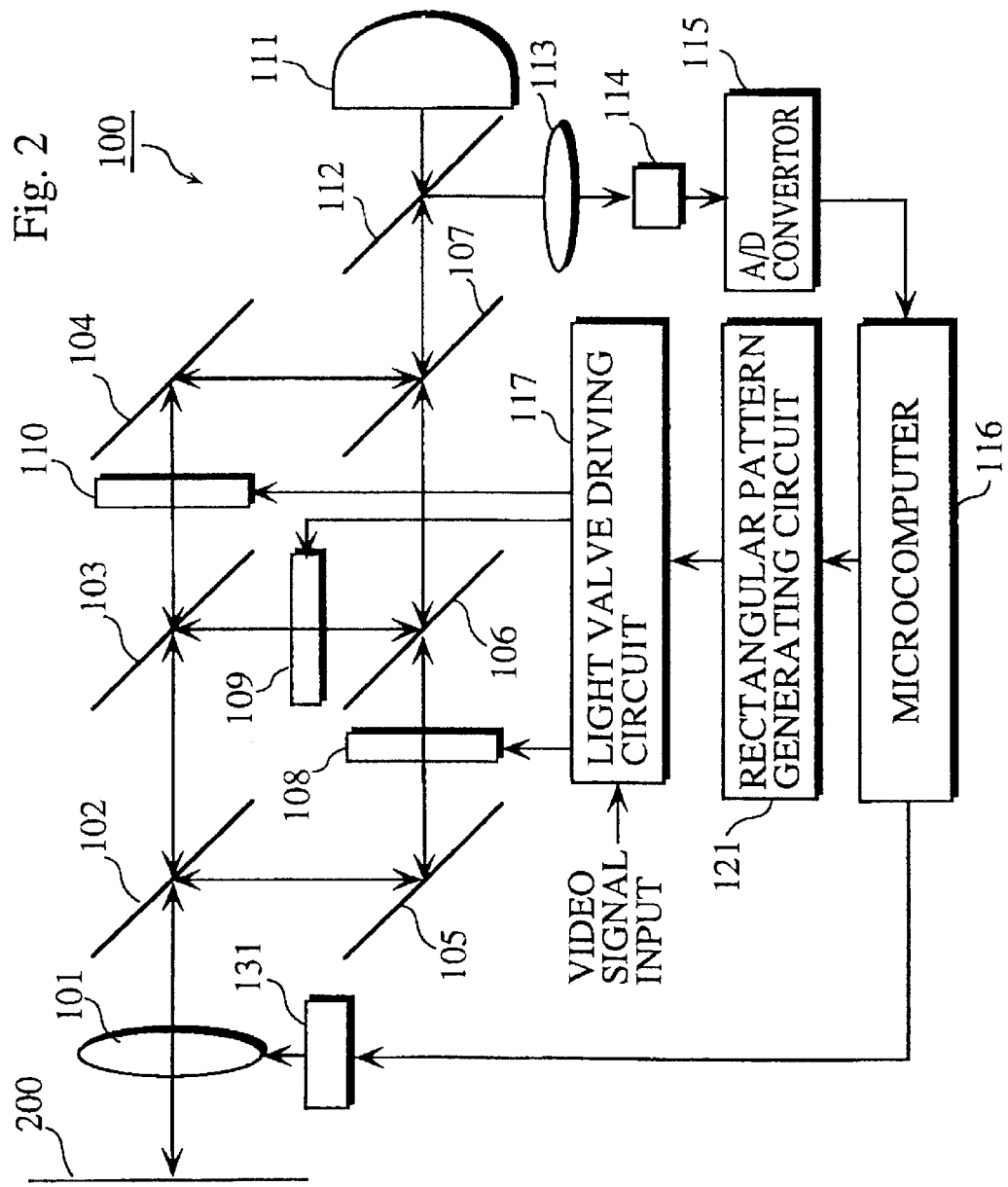

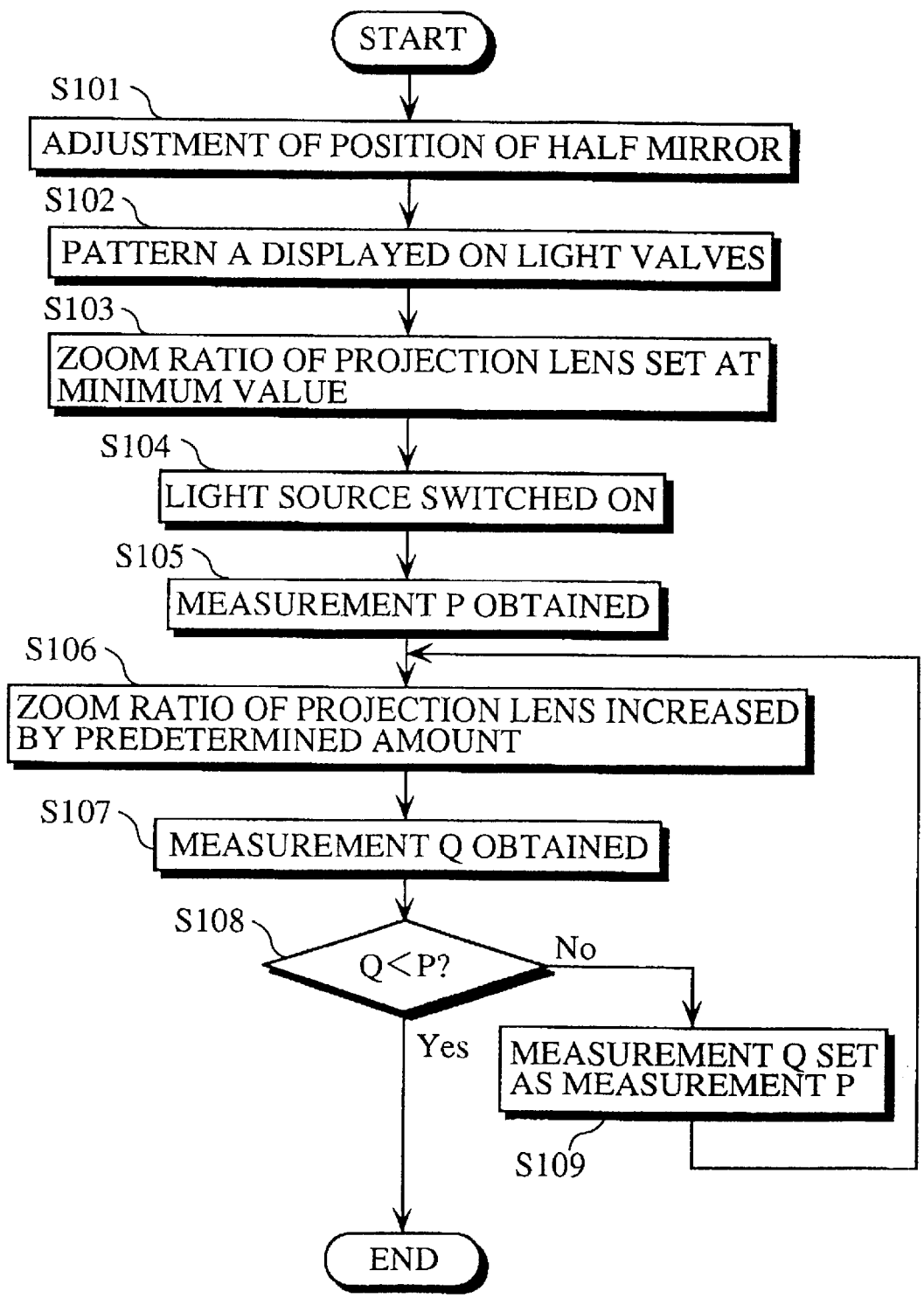

PROJECTOR THAT AUTOMATICALLY ADJUSTS THE PROJECTION PARAMETERS

This application is based on Application Ser. Nos. H10-180130, H10-198485 and H10-198486 filed in Japan, the contents of which are hereby incorporated by reference.

BACKGROUND OF THE INVENTION

1. Field of the Invention

The present invention relates to a projector that automatically adjusts projection parameters such as zoom ratio, focus, and convergence.

2. Description of Related Art

In the field of projectors, one example of a technology that automatically adjusts projection parameters such as convergence and focus is disclosed in U.S. Pat. No. 5,231,481. In this technology, a photographic device, such as a video camera, photographs an image that a projector projects onto a screen to obtain image data. An information processing apparatus such as a microcomputer then analyzes this image data to detect adjustment errors in the projection parameters and performs suitable corrections to the settings of the projector. The following describes the operation of this technology when automatically adjusting the focus of the projection lens.

FIG. 1 is a block diagram showing the construction of the projector 900 in this related art. As shown in FIG. 1, the projector 900 includes a projection lens 901, dichroic mirrors 902, 903, 906, and 907, mirrors 904 and 905, light valves 908, 909, and 910, a light source 911, an A/D convertor 915, a microcomputer 916, a test pattern generating circuit 929, and a projection lens focus adjusting mechanism 933. The image that this projector 900 projects onto the screen 980 is photographed by the video camera 990. The image photographed by the video camera 990 is subjected to A/D (analog to digital) conversion by the A/D convertor 915 and is then inputted into the microcomputer 916 as image data.

The microcomputer 916 analyzes the inputted image data and, based on the results of this analysis, controls the projection lens focus adjusting mechanism 933 to have the focus of the projection lens 901 adjusted. Note that while the optical paths from each of the light valves 908, 909, and 910 to the projection lens 901 appear to have different lengths in the example illustrated in FIG. 1, such paths can be easily adjusted using conventional technologies, such as through the use of additional lenses (not illustrated). As described in the embodiments of the invention, this problem can also be addressed by changing the positioning of the dichroic mirrors or other components.

As described above, the projector 900 of the above technology requires the further use of a video camera 990 to photograph the image projected onto the screen 980. This leads to the problems of a rise in the cost of the technology and of the user having to perform the difficult task of correctly orienting the video camera 990 toward the screen 980.

SUMMARY OF THE INVENTION

It is a primary object of the present invention to provide a projector that can automatically adjust the projection parameters with a simple operation while suppressing the cost of the overall equipment.

This primary object can be realized by a projector that projects images onto a screen by passing light from a light source through a light valve and a projection lens, the projector comprising: reflected light detecting means for detecting light that has been reflected off the screen and back through the light valve; and projection parameter adjusting means for adjusting a projection parameter based on a detection result of the reflected light detecting means.

With the stated construction, light reflected back off a screen is detected and used to adjust the projection parameters, so that there is no need to use expensive equipment, such as a video camera, for photographing an image projected onto the screen. Adjustments to the positioning of the video camera or other such additional equipment are also unnecessary, thereby making automatic adjustment possible with a simple operation.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 2 shows the construction of a projector that is a first embodiment of the present invention;

FIG. 4 is a flowchart showing the processing by the microcomputer 116 in the first embodiment of the present invention;

FIG. 17A shows an example construction of the screw end holding mechanism 431, while

DESCRIPTION OF THE PREFERRED EMBODIMENTS

Figure 1:
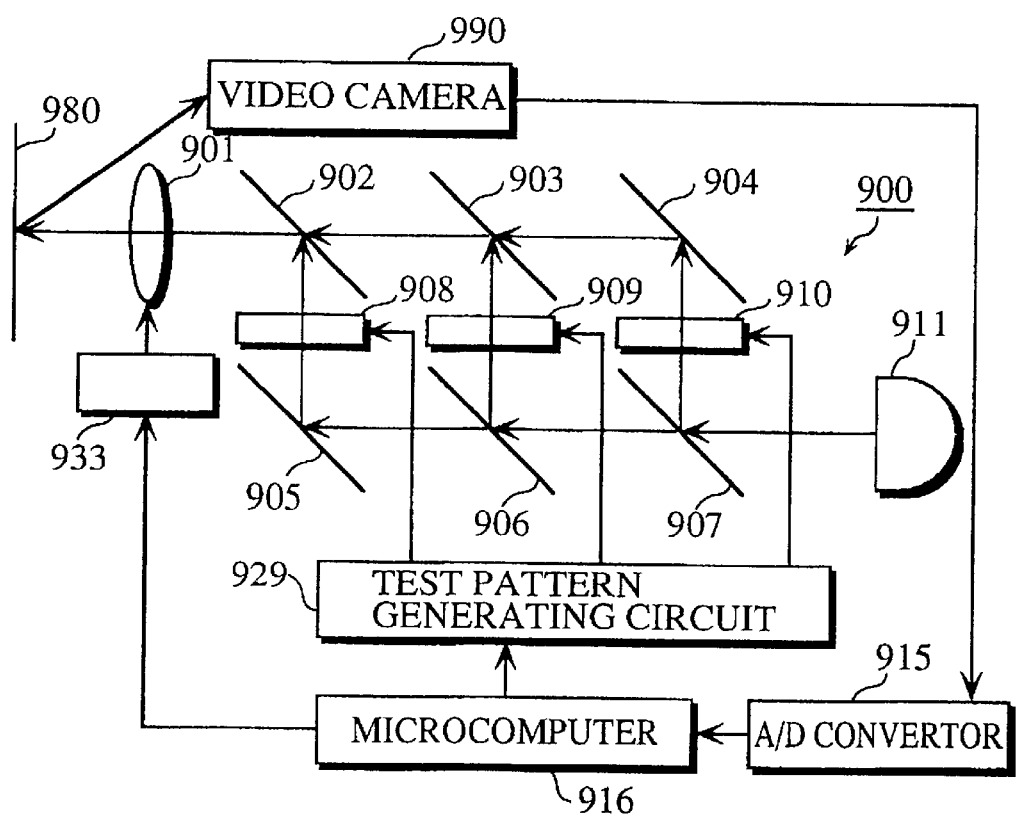
FIG. 1 is a block diagram showing the construction of a projector that automatically adjusts the focus of the projection lens using a video camera.

The following describes several embodiments of the present invention, with reference to the attached drawings.

FIRST EMBODIMENT

FIG. 2 shows the construction of a projector that is a first embodiment of the present invention. As shown in the figure, the projector 100 includes the projection lens 101, the dichroic mirrors 102, 103, 106, and 107, the mirrors 104 and 105, the light valves 108, 109, and 110, the light source 111, the A/D convertor 115, the microcomputer 116, the light valve driving circuit 117, the rectangular pattern generating circuit 121, and the projection lens zoom ratio adjusting mechanism 131. This projector 100 projects images onto the screen 200.

The dichroic mirror 107 reflects only the red light in the white light emitted by the light source 111 and passes the other constituent parts of the white light. The dichroic mirror 106 reflects only the green light in the light passed by the dichroic mirror 107 and passes the other constituent parts of this light. The mirror 105 reflects the blue light that has passed through both the dichroic mirror 106 and the blue image light valve 108.

The mirror 104 reflects the red light that has been reflected by the dichroic mirror 107 to direct it toward the red image light valve 110. The dichroic mirror 103 passes the red light that has passed the red image light valve 110 and reflects the green light that has been reflected by the dichroic mirror 106 and has passed the green image light valve 109. The dichroic mirror 102 passes the red light that has passed the dichroic mirror 103 and the green light that has been reflected by the dichroic mirror 103, and reflects the blue light that has been reflected by the mirror 105, thereby directing the recombined light toward the projection lens 101. Note that the above construction forms what is conventionally known as a three-chip projector.

The light valves 108~110 for the three primary colors can be realized by conventional technologies such as liquid-crystal light valves. These light valves 108~110 are separately controlled by the light valve driving circuit 117. In addition to video signals that are used for normal image projection, this light valve driving circuit 117 receives an input of a variety of test patterns that are used for the automatic correction of the projection parameters, and is itself controlled according to such inputted signals using a conventional control method. The variety of test patterns that are used for the correction of the projection parameters are controlled by the microcomputer 116. In the present embodiment, a signal for having a rectangular pattern displayed is outputted via the rectangular pattern generating circuit 121. Such test patterns for use when adjusting the projection parameters are described in detail later in this specification.

As shown in FIG. 2, the projector 100 of the present embodiment includes a half mirror 112 that is disposed at a position between the light source 111 and the dichroic mirror 107. The position of this half mirror 112 can changed by a driving means (not illustrated). When the projection parameters of the projector are being automatically adjusted, the half mirror 112 allows light from the light source 111 to pass while reflecting the light that has been reflected off the screen 200 and has passed back through the projection lens 101 and the light valves 108~110, thereby directing this reflected light through the collective lens 113 toward the light detecting element 114. When the projection parameters are not being adjusted, this half mirror 112 is moved out of the optical path of the light emitted by the light source 111.

Figure 3A:
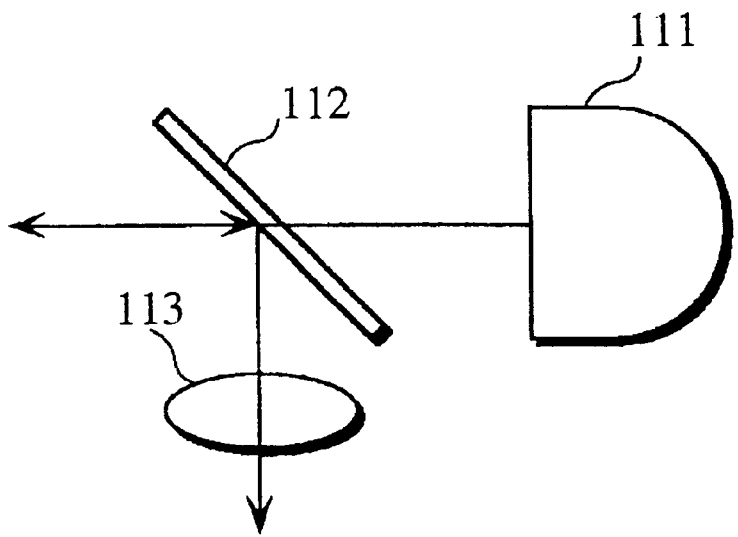
FIG. 3A and FIG. 3B show the respective positions of the half mirror 112 when the projection parameters are being adjusted and at other times.
Figure 3B:
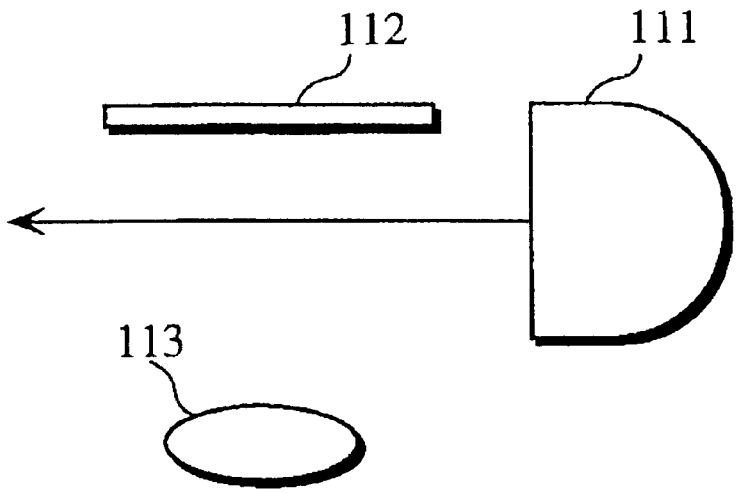

FIG. 3A shows the position of the half mirror 112 when the projection parameters are being adjusted, while FIG. 3B shows its position at other times. As shown in FIG. 3A, when the projection parameters are being adjusted, the half mirror 112 is set at an approximately 45° with respect to the path taken by the light emitted from the light source 111 toward the dichroic mirror 107, so that the light reflected back off the screen 200 is collected by the collective lens 113. The light detecting element 114 is provided at the point at which this reflected light is collected so as to measure the intensity of the reflected light. On the other hand, when the projection parameters are not being adjusted, such as in a standard operation where the projector projects images based on a video signal, the half mirror 112 is moved out of the optical path of the light emitted by the light source 111, as shown in FIG. 3B.

A photo diode (PD), a charge-coupled device (CCD) or similar may be used as the light detecting element 114. The A/D convertor 115 converts the output signal of the light detecting element 114 into a digital signal which is then inputted into the microcomputer 116. This microcomputer 116 controls the projection lens zoom ratio adjusting mechanism 131 according to the output of the A/D convertor 115 and so automatically adjusts the zoom ratio of the projection lens 101. The projection lens zoom ratio adjusting mechanism 131 is a conventional device, and so will not be described.

The following is a detailed description of the method for automatically adjusting the zoom ratio of the projection lens. FIG. 4 is a flowchart showing the processing by the microcomputer 116 when automatically adjusting the zoom ratio of the projection lens 101. Note that when this automatic adjustment is being performed, it will be necessary to have roughly adjusted factors such as the positioning of the projector 100 and its orientation roughly adjusted in advance. Such rough adjustments are required since it is not possible to have the projection parameters automatically adjusted based on light that has been reflected from the screen 200 if, for example, the light projected by the projector 100 is not actually incident on the screen 200. If the projector 100 has been already set up at a suitable position, however, such rough adjustments do not need to be made.

Figure 5:
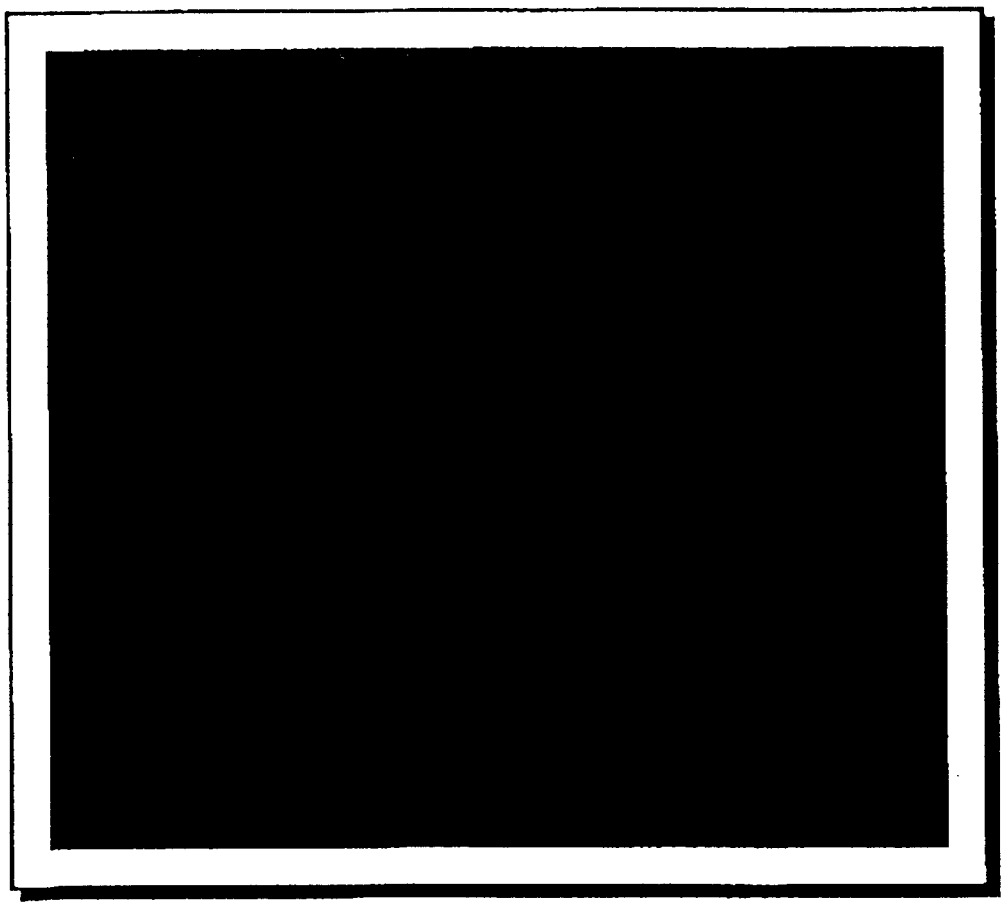
FIG. 5 shows an example of pattern A.
Figure 6:
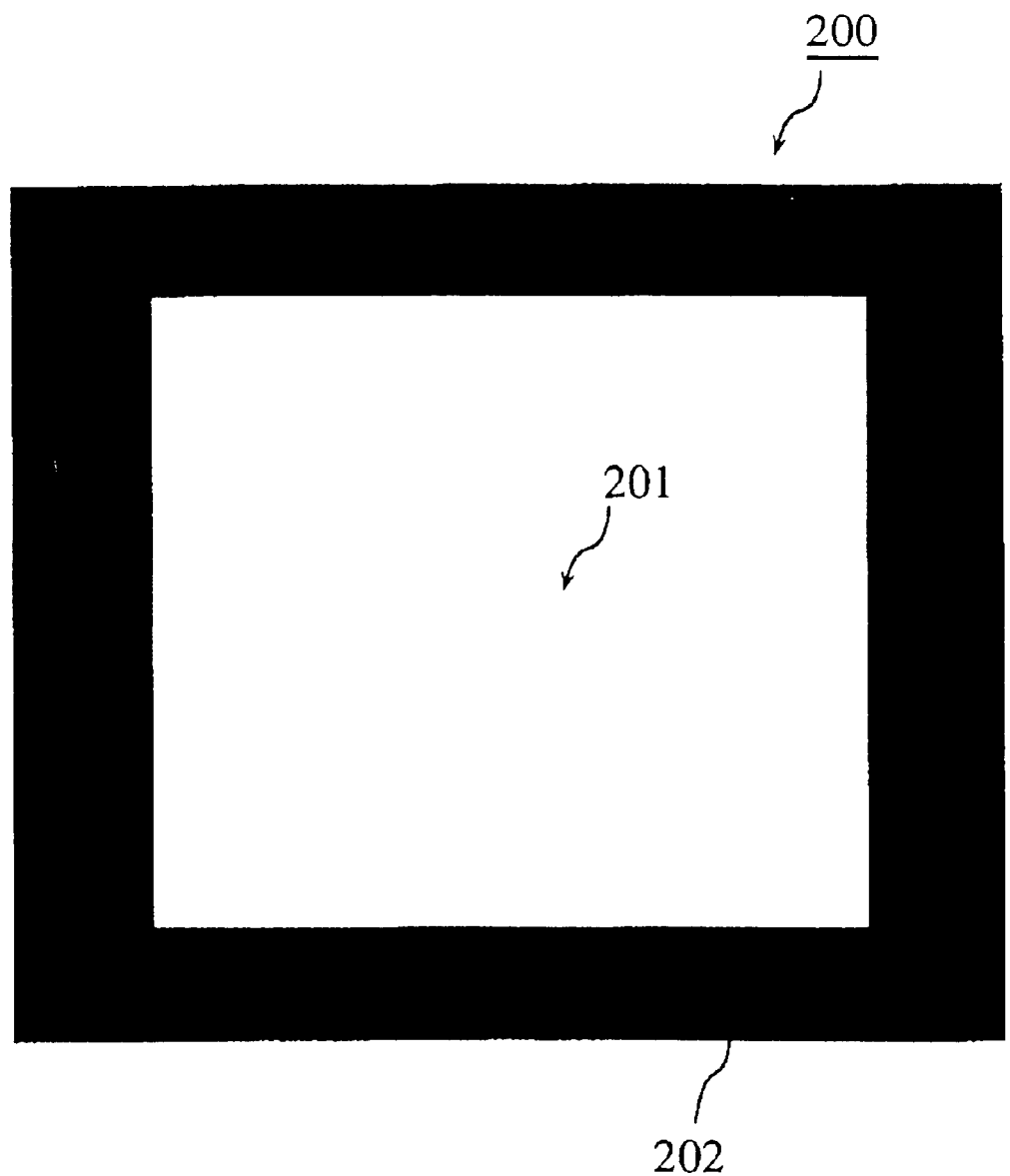
FIG. 6 shows an example of the appearance of the screen 200.

Once the rough adjustments to the positioning of the projector 100 have been made and the projector 100 has been instructed to automatically adjust the zoom ratio of the projection lens 101, the microcomputer 116 commences the processing shown in the flowchart of FIG. 4. First, the half mirror 112 is moved into the position shown in FIG. 3A. (S101). Next, a rectangular pattern (hereafter, "pattern A") for adjusting the zoom ratio of the projection lens 101 is displayed on the blue image light valve 108, the green image light valve 109, and the red image light valve 110 (hereafter, collectively referred to as the "light valves 108~110") (S102). Pattern A, as shown in the example in FIG. 5, is such that light passes near the edges of the light valves 108~110, meaning that such parts are in an "open" state, while no light passes through the central parts of the light valves 108~110, meaning that such parts are in a "closed" state. When an image of this kind of pattern is projected onto a screen 200 that has a dark border, such as in FIG. 6, overmagnification by the projection lens 101 will result in the image of pattern A extending beyond the image display area 201 of the screen 200 and onto the border 202.

If the image of pattern A is projected onto the border 202, none of the light incident on the border 202 will be reflected, thereby reducing the intensity of the light reflected back from the projected image of pattern A. This means that by controlling the zoom ratio of the projection lens 101 based on the intensity of the reflected light obtained via the light detecting element 114 and the A/D convertor 115, automatic adjustment of the zoom ratio can be performed.

Returning to the flowchart of FIG. 4, in step S102, when the light valve driving circuit 117 has had pattern A displayed by the light valves 108~110, the microcomputer 116 controls the projection lens zoom ratio adjusting mechanism 131 to set the zoom ratio of the projection lens 101 at its minimum value (S103) and switches on the light source 111 (S104). By performing this processing, the microcomputer 116 obtains the intensity of the light reflected back off the screen 200 as the output of the A/D convertor 115. On receiving this value, the microcomputer 116 first sets this current output value of the A/D convertor 115 as the measurement P (S105). Note that in this embodiment, the switching on of the light source 111 is described as being controlled by the microcomputer 116, although other control methods are possible. The light source 111 may even be switched on manually. This is also true for the following embodiments.

Next, the microcomputer 116 controls the projection lens zoom ratio adjusting mechanism 131 and has the zoom ratio of the projection lens 101 increased by a predetermined amount (S106). Here, this predetermined amount may be a fixed value, a value that can be changed according to the operating conditions of the projector 100, or a value that can be freely selected by the user, so that no particular meaning should be inferred from the word "predetermined". Once the zoom ratio has been increased in this way, the microcomputer 116 receives the output value of the A/D convertor 115 and sets the value as the measurement Q (S107). The microcomputer 116 then compares the measurements P and Q, and ends the automatic adjustment of the zoom ratio if the measurement Q has fallen below the measurement P (S108:Yes). This corresponds to the case described earlier where the projected image of pattern A protrudes onto the border 202 of the screen 200, thereby reducing the intensity of the reflected light. If the measurement Q is equal to or greater than the measurement P (S108:No), the measurement Q is set as the measurement P (S109) and the processing returns to step S106 where the zoom ratio of the projection lens 101 is again increased by a predetermined amount.

As described above, the zoom ratio of the projection lens 101 is adjusted while monitoring the intensity of the light reflected off the screen 200 when pattern A is displayed on the light valves 108~110. This means that the automatic adjustment of the zoom ratio of the projection lens 101 can be performed with a simple operation.

Note that while the present embodiment states that a decrease in the intensity of the reflected light is due to the projected image of pattern A protruding onto the border 202, the width of the open part of pattern A need not be as shown in FIG. 5. Provided that light passes through parts of the image that correspond to the edges of the image projected onto the screen 200, other patterns may be used. This means that the open part of the pattern can be wide or narrow, and, depending on the detection accuracy of the light detecting element 114, a pattern that is entirely "open" may even be used. Here, it should be obvious that the width of the open part should be set an suitable value for the detection accuracy of the light detecting element 114.

SECOND EMBODIMENT

The following describes a second embodiment of the present invention. This embodiment is a method for automatically adjusting the zoom ratio of the projection lens when images projected by a plurality of projectors are combined on a single screen.

Figure 7:
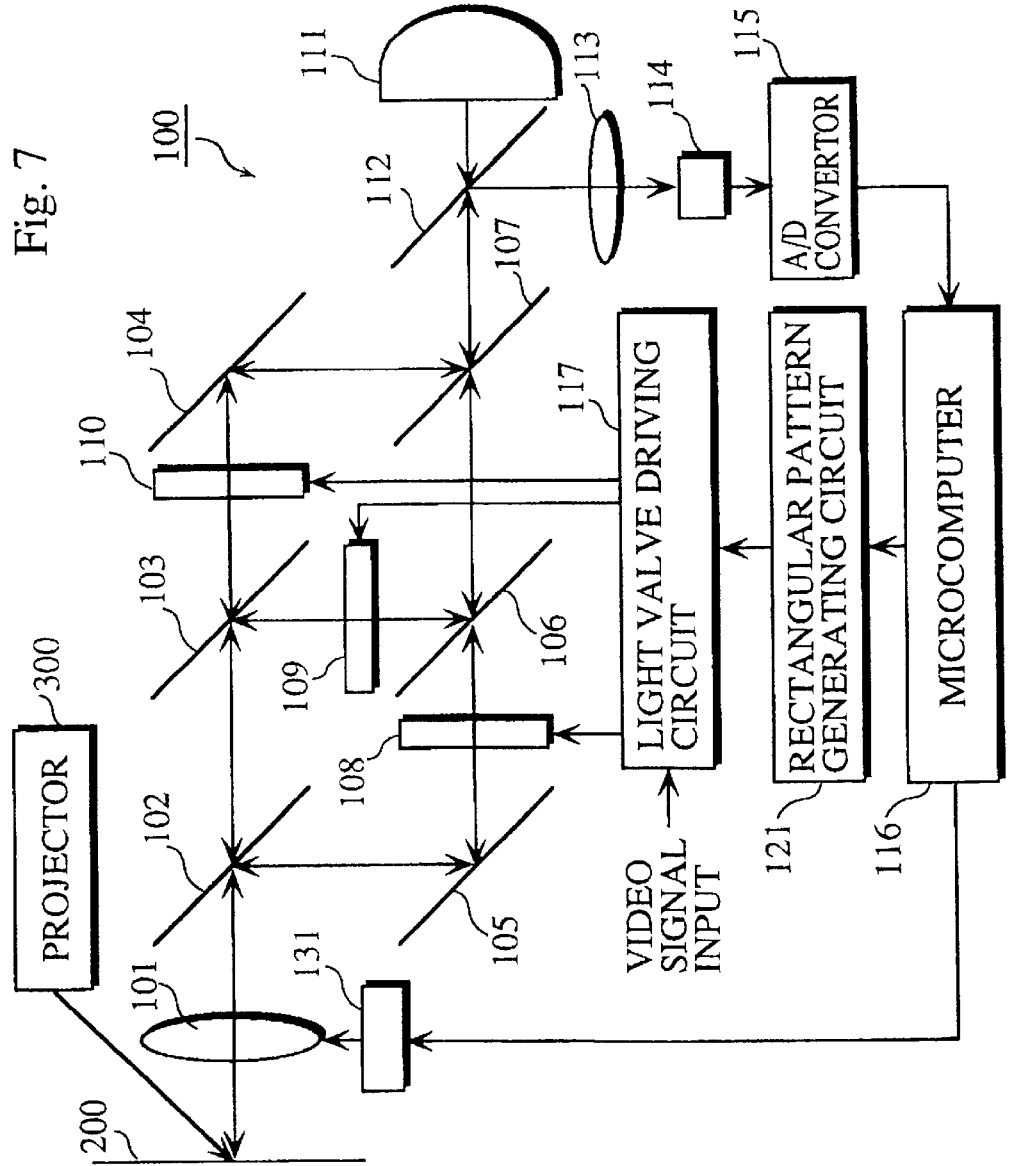
FIG. 7 shows the construction of the projector of the second embodiment.

FIG. 7 shows the construction of the projector 100 in this embodiment. As shown in FIG. 7, the present projector has the same construction as that described in the first embodiment. However this embodiment differs from the first embodiment in having another projector, projector 300, project an image onto the screen 200 and in performing automatic adjustment of the zoom ratio of the projection lens 101 of the projector 100 by having the projector 300 project a standard pattern onto the screen 200 and controlling the projector 100 so that a pattern projected by the projector 100 will coincide with the standard pattern projected by the projector 300. The following explanation focuses on the changes that arise in the processing of the microcomputer 116 due to these differences. The reason that an image is formed on the screen using a plurality of projectors is that there are cases when a single projector is unable to project a sufficiently bright image onto a screen provided in a large space, such as a hall or a conference room. In such cases, a plurality of projectors are used to project the same image onto the screen.

Figure 8:
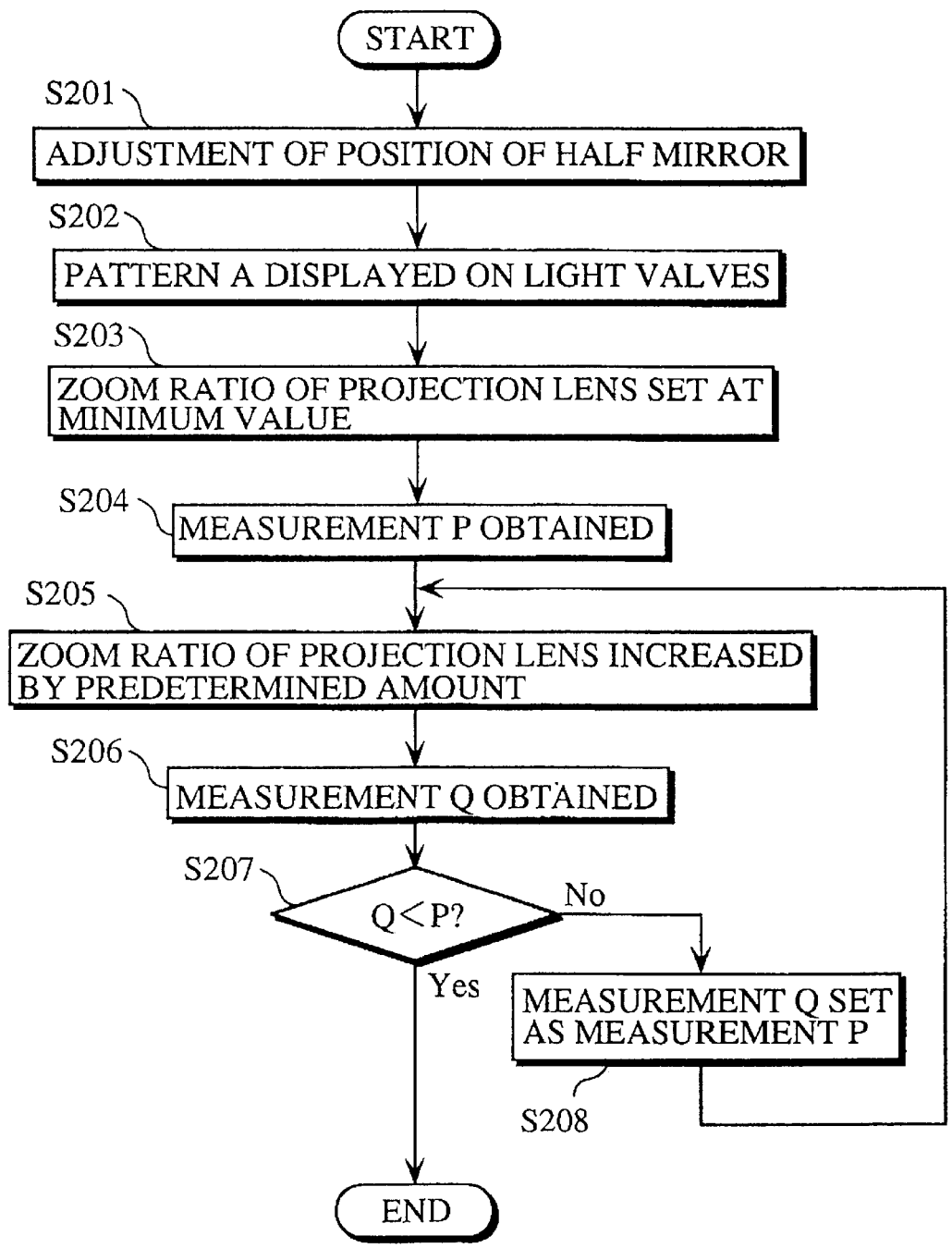
FIG. 8 is a flowchart showing the processing by the microcomputer 116 in the second embodiment of the present invention.

FIG. 8 is a flowchart showing the processing of the microcomputer 116 of the projector 100 in this second embodiment. In this embodiment, it should be obvious that it is preferable for the two projectors to be positioned so that their images roughly coincide before the automatic adjustment of the projection parameters is performed. It is also preferable for rough adjustments to be made to the projection parameters of the two projectors, such as the focus of the projection lens, before such automatic adjustment is performed. This is because proper adjustment of such parameters improves the precision with which the intensity of the reflected light can be detected.

As shown in FIG. 8, the processing of the microcomputer 116 in this second embodiment is for the most part the same as the processing in the first embodiment which was shown in FIG. 4. However, the present embodiment detects the intensity of light reflected back off an image projected by the projector 300, so that the light source 111 of the projector 100 does not need to be switched on when adjusting the projection parameters. According, the process that switches the light source 111 on is omitted (see S204). This means that in this embodiment, in step S202 pattern A is displayed on the light valves 108~110. of the projector 100 and an image of pattern A is projected onto the screen 200 by the projector 300. The timing at which the projector 300 projects this image of pattern A can be anytime before step S204 where the measurement P is obtained in the same way as in the first embodiment.

The reason pattern A is displayed on the light valves 108~110 of the projector 100 is as follows. The light reflected back off the screen passes through the projection lens 101 and forms images upon the light valves 108~110. If pattern A is also displayed on the light valves 108~110 at this point, the detected intensity of the reflected light that passes through the open parts of pattern A on the light valves 108~110 will be greatest when the two projectors are in a state whereby the images projected by the two projectors would exactly coincide on the screen 200.

Based on this logic, once the measurement P has been obtained in step S204, the same control is performed as in the first embodiment so as to automatically adjust the zoom ratio of the projection lens 101 of the projector 100 to a state where images projected by the two projectors would exactly coincide on the screen 200. This setup has the advantages of lower cost and of easier operation for adjustment of the projection parameters over systems where a video camera is used.

In the present embodiment, if the light source 111 of the projector 100 is not used during adjustment, a mirror can be used in place of the half mirror 112. This mirror can be set in the position shown for the half mirror 112 in FIG. 3B and can be moved the position of the half mirror 112 in FIG. 3A when automatic adjustment of the projection parameters is performed. This is also true for the following embodiments.

THIRD EMBODIMENT

The following describes a third embodiment of the present invention. This embodiment is a method for automatically adjusting a displacement in the axis of the projection lens when images projected by a plurality of projectors are combined on a screen. Here, an adjustment of the displacement in the axis of the projection lens refers to an adjustment in the vertical position of the projected image on the screen 200 that is achieved by changing the position of the projection lens 101.

Figure 9:
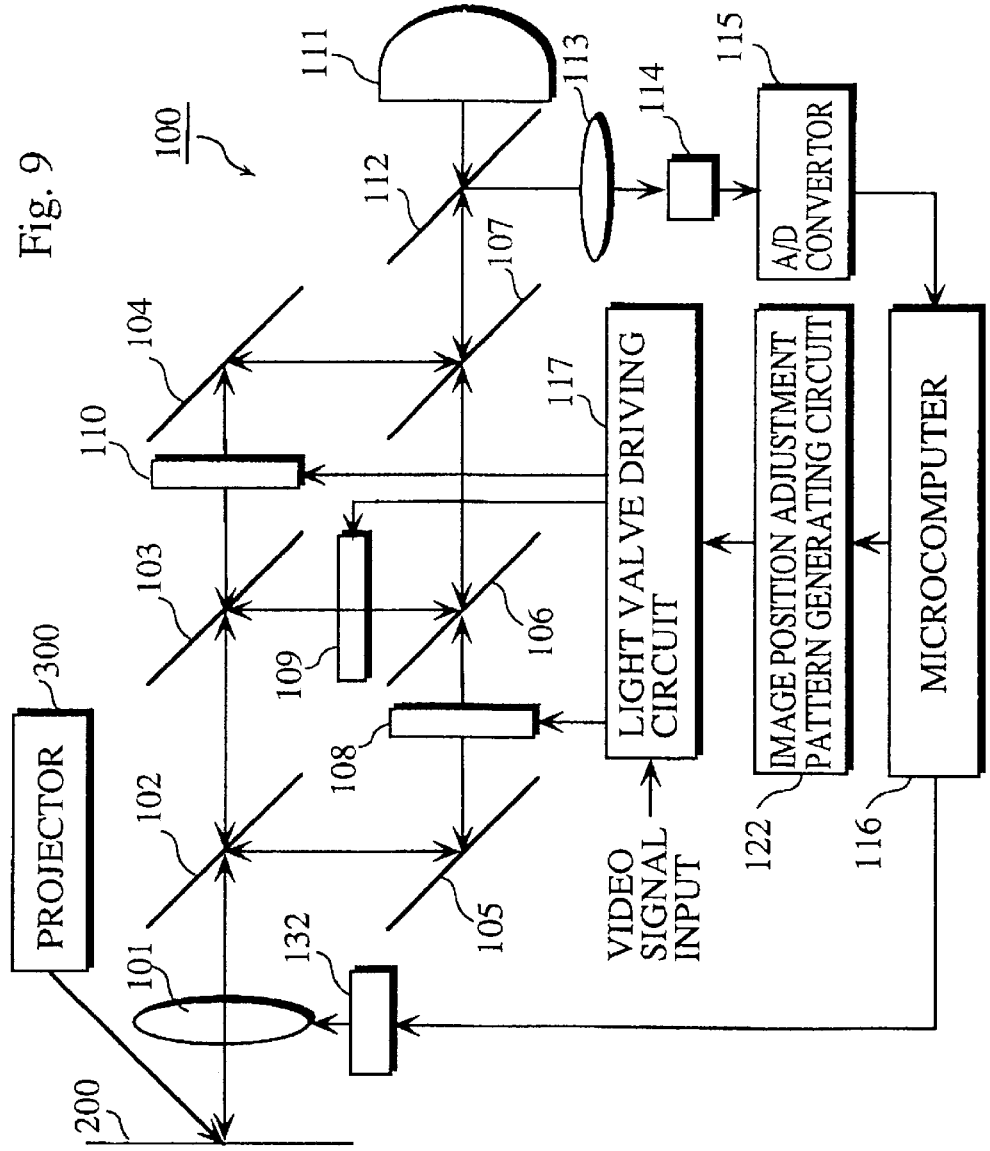
FIG. 9 shows the construction of the projector of the second embodiment.

FIG. 9 shows the construction of the projector 100 in this embodiment. As shown in FIG. 9, the present projector has largely the same construction as that described in the second embodiment. The differences with the second embodiment lie in the provision of the projection lens axis displacement adjusting mechanism 132 in place of the projection lens zoom ratio adjusting mechanism 131, and in the provision of the image position adjustment pattern generating circuit 122 in place of the rectangular pattern generating circuit 121, due to the need to form a different pattern on the screen 200 to that formed in the second embodiment. The following explanation will focus on these differences.

Figure 10:
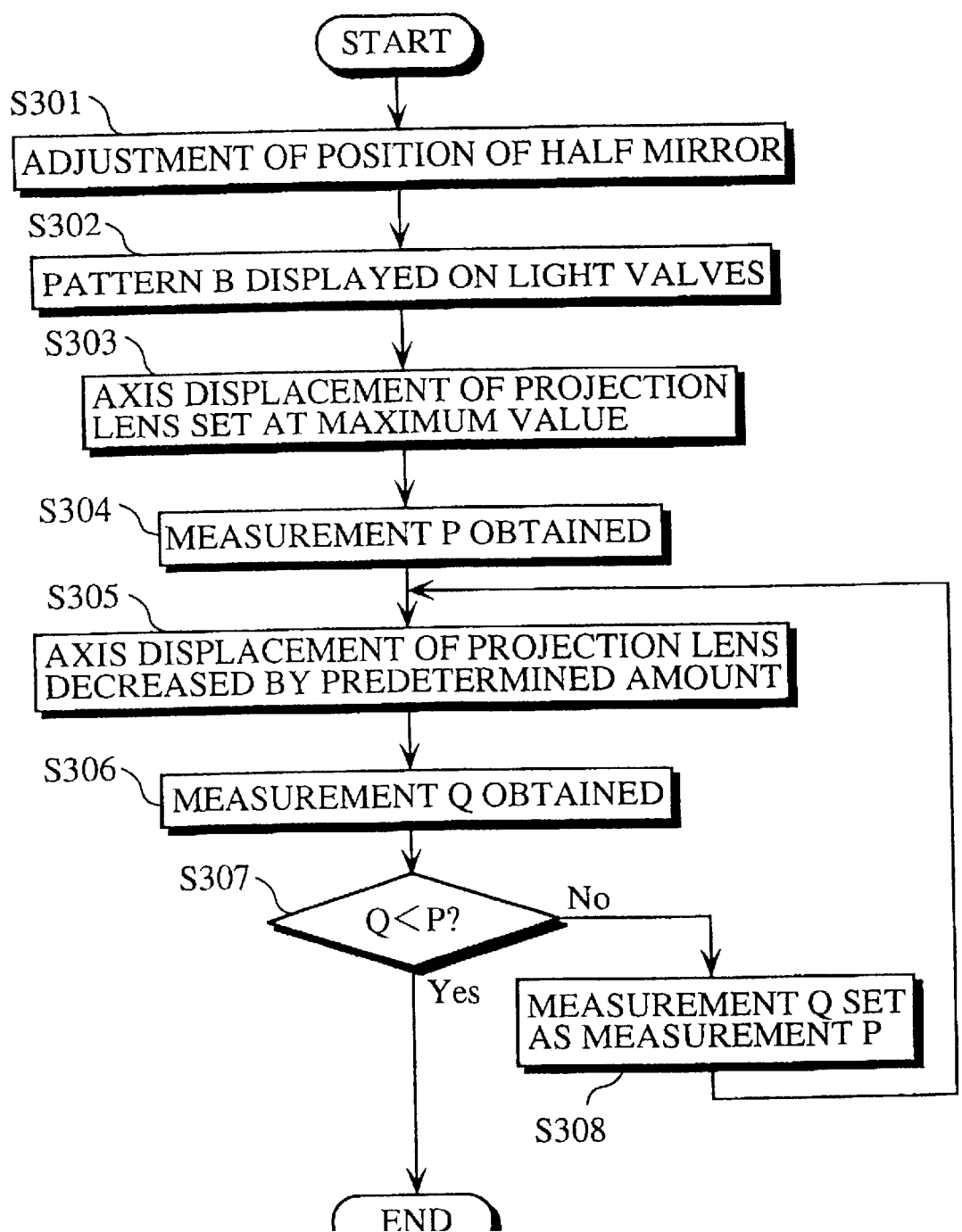
FIG. 10 is a flowchart showing the processing by the microcomputer 116 in the third embodiment of the present invention.

FIG. 10 is a flowchart showing the processing of the microcomputer 116 in this third embodiment. The processing of the microcomputer 116 in this embodiment is for the most part the same as in the second embodiment shown in FIG. 8, with the only differences relating to the provision of the projection lens axis displacement adjusting mechanism 132 as the adjusting mechanism for the projection parameters.

Figure 11:
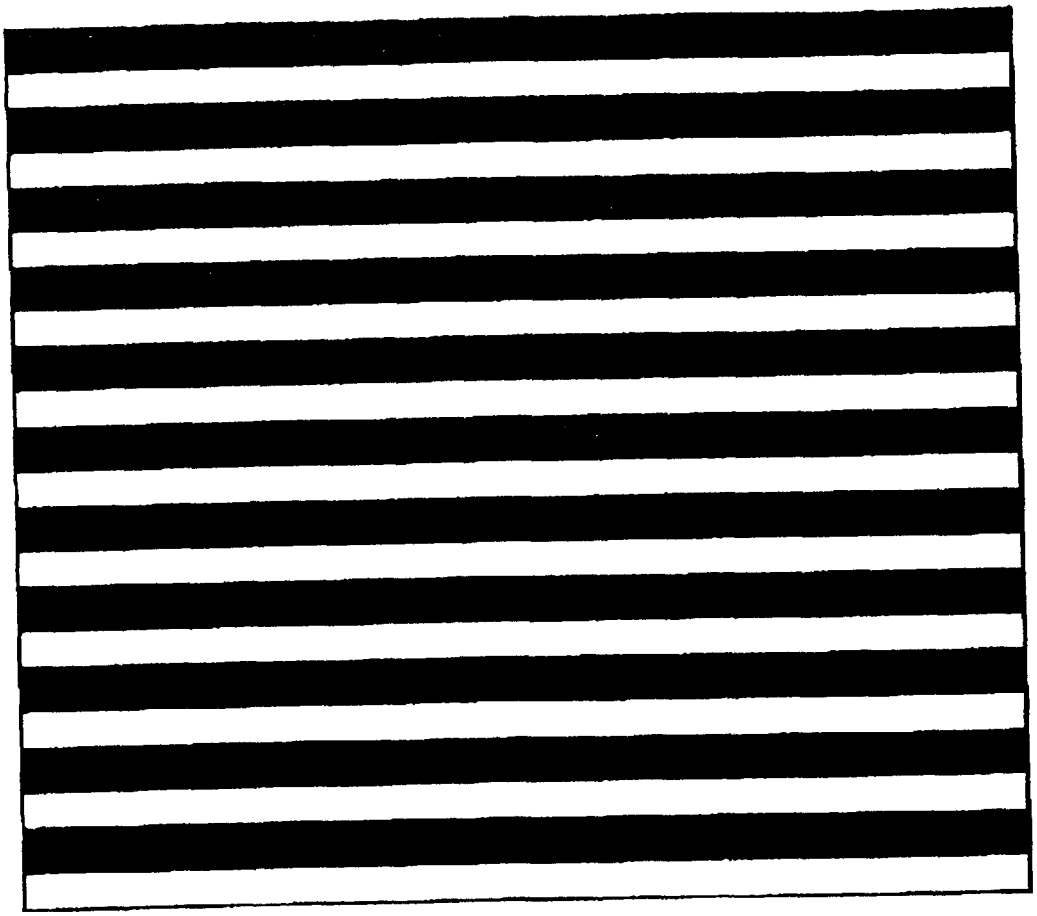
FIG. 11 shows an example of pattern B.

For the same reasons as were described in the second embodiment, it is preferable for the two projectors to be positioned so that their images roughly coincide, and for rough adjustments to be made to the projection parameters of the two projectors, such as the focus of the projection lens, before automatic adjustment is performed. In this third embodiment, a horizontal stripe pattern (hereafter, "pattern B") is used in place of pattern A as the standard pattern whose image is projected by the projector 300 and which is also displayed on the light valves 108~110 of the projector 100 (S302). An example of pattern B is shown in FIG. 11, although, as in the preceding embodiments, there are no particular limitations regarding the widths of the open and closed parts of this pattern. Also, while the present embodiment describes the case where a horizontal stripe pattern of open and closed parts is used as the standard pattern, the gist of the present invention only requires that a horizontal stripe pattern composed of both bright and dark parts is used. Accordingly, the brightness the parts corresponding to open and closed areas may be changed. If the two projectors have been aligned so that there is almost no horizontal displacement in their projected images, a wave or zigzag pattern may alternatively be used as the standard pattern.

When the projector 300 projects an image of pattern B onto the screen 200, the light reflected back off the screen 200 forms images on the light valves 108~110 of the projector 100. Since pattern B is displayed on the light valves 108~110, the intensity of the reflected light that is collected into the light detecting element 114 of the projector 100, which is to say the output value of the A/D convertor 115, will be greatest when the two projectors are in a state whereby the images projected by the two projectors exactly coincide on the screen 200. This state indicates that the axis displacement of the projection lens of the two projectors have been properly adjusted.

According to the above logic, almost the same processing as in the second embodiment is performed from step S303 onwards, so that the axis displacement of the projection lens 101 of the projector 100 is automatically adjusted until a state is reached where the images projected by the two projectors 100 and 300 coincide on the screen 200. In more detail, in step S303 the projection lens axis displacement adjusting mechanism 132 in the projector 100 sets the lens axis displacement at its maximum value (here, a value that has the projected image displayed at a highest point on the screen 200). The projector 300 is made to project an image of pattern B on the screen 200, and the output value of the A/D convertor 115 is obtained as the measurement P (S304). Note that a conventional device can be used as the projection lens axis displacement adjusting mechanism 132, so that no description of such will be given.

The projection lens axis displacement adjusting mechanism 132 is then controlled so that to reduce the axis displacement by a predetermined amount (S305). As a result, the image of pattern B formed on the light valves 108~110 by the reflected light will be shifted downward by a predetermined amount. The output value of the A/D convertor 115 is obtained at this point as the measurement Q (S306). Note that any amount can be used as the predetermined amount for reducing the axis displacement, and a fixed value or a variable value may be used as in the preceding embodiments.

In the same way as in the second embodiment, when the measurement Q falls below the measurement P (S307:Yes), the adjustment of the axis displacement of the projection lens 101 is complete. When this is not the case, the projection lens axis displacement adjusting mechanism 132 further reduces the axis displacement and the processing thereafter is repeated (S308, S305).

Like the preceding embodiments, the present embodiment has the advantages of lower cost and of easier operation for adjustment of the projection parameters over systems where a video camera is used. Note that in this embodiment, depending on the relationship between the range over which the projection lens axis displacement adjusting mechanism 132 can adjust the axis displacement and the width of the horizontal stripes in pattern B, high values may be detected for the intensity of the reflected light outputted by the A/D convertor 115 at more than one lens position. Accordingly, the adjustment need not end when the measurement Q falls below the measurement P as is shown in FIG. 10. Output values of the A/D convertor 115 may be obtained across the entire range over which the axis displacement can be adjusted and may be stored in a storage device such as a memory. After doing so, the projection lens axis displacement adjusting mechanism 132 can be controlled to set the axis displacement at the value that gives the highest output value of the A/D convertor 115 across the entire range over which the axis displacement can be adjusted. By doing so, the axis displacement can be adjusted more accurately. However, if the respective axis displacements of the projection lenses of the two projectors are adjusted to similar values during the rough adjustments, a sufficiently accurate adjustment can be achieved by the method shown by the flowchart in FIG. 10.

FOURTH EMBODIMENT

The following describes a fourth embodiment of the present invention. This embodiment is a method for automatically adjusting the focus of the projection lens when an image is formed on a screen using a single projector.

Figure 12:
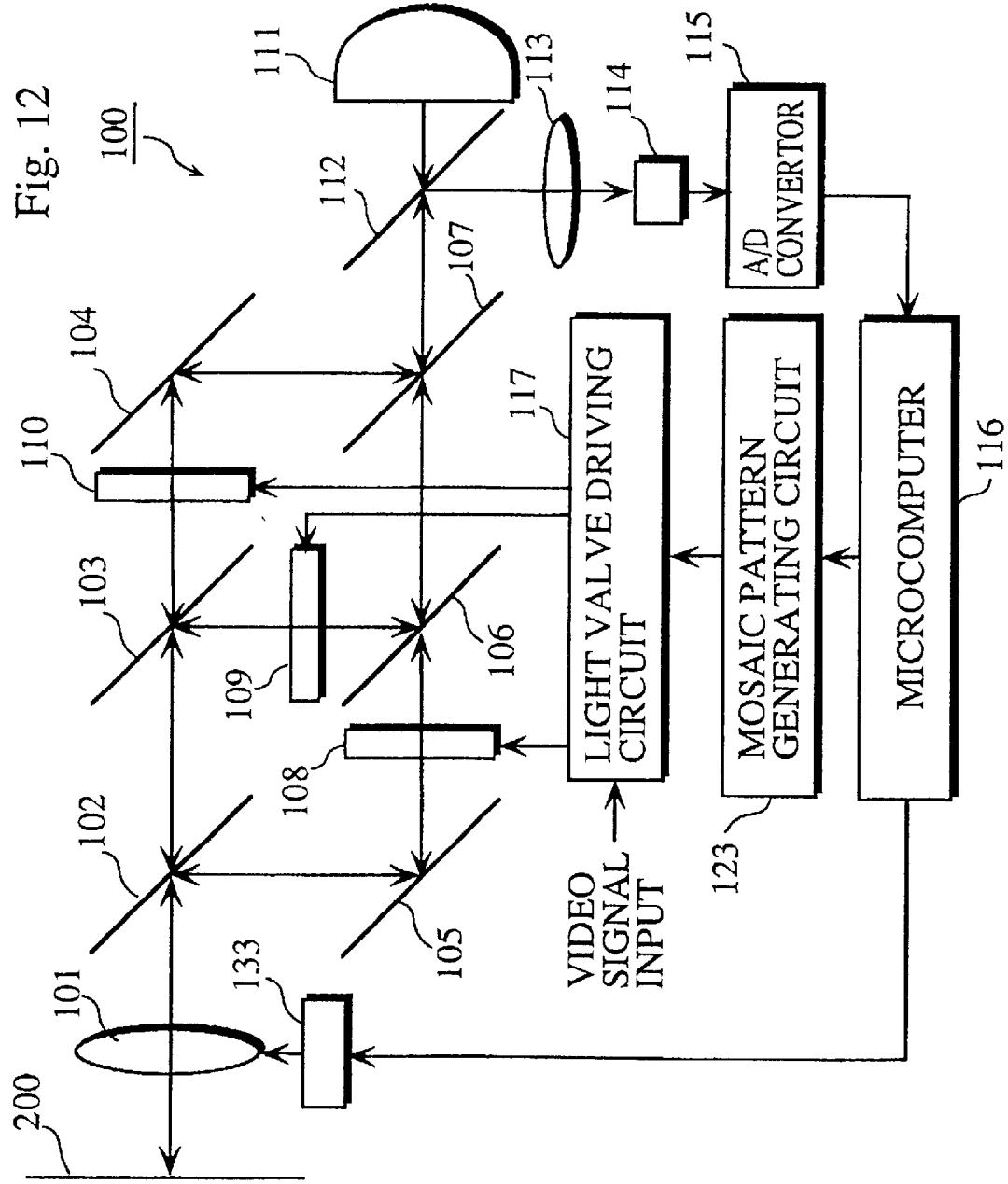
FIG. 12 shows the construction of the projector of the fourth embodiment.

FIG. 12 shows the construction of the projector 100 in this embodiment. As shown in FIG. 12, the present projector has largely the same construction as that described in the first embodiment. The differences with the first embodiment lie in the provision of the projection lens focus adjusting mechanism 133 in place of the projection lens zoom ratio adjusting mechanism 131, and in the provision of the mosaic pattern generating circuit 123 in place of the rectangular pattern generating circuit 121, due to the need to form a different pattern on the screen 200 to that formed in the first embodiment. The following explanation will focus on these differences.

Figure 13:
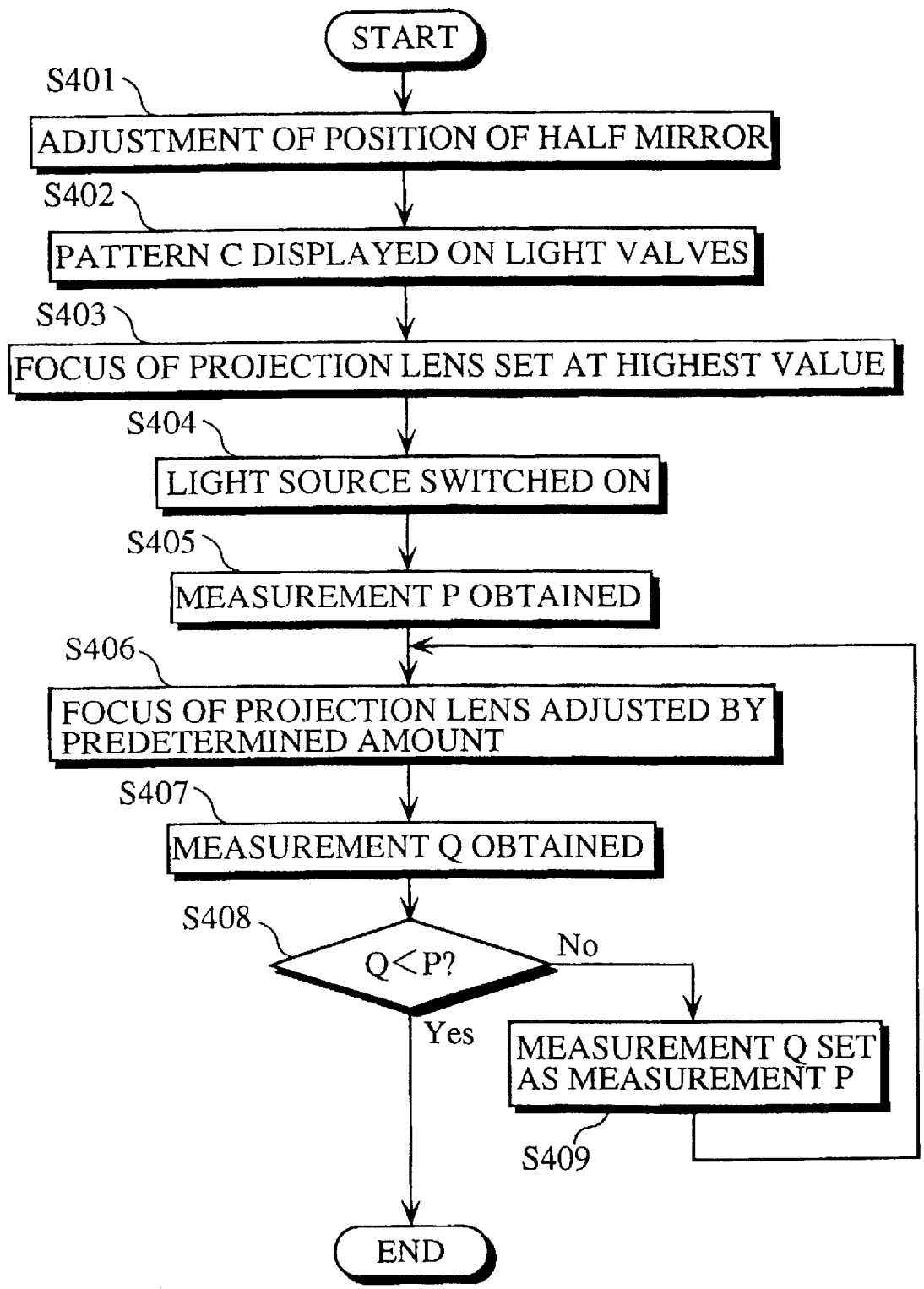
FIG. 13 is a flowchart showing the processing by the microcomputer 116 in the fourth embodiment of the present invention.

FIG. 13 is a flowchart showing the processing of the microcomputer 116 in this fourth embodiment. The processing of the microcomputer 116 in this embodiment is for the most part the same as in the first embodiment, with the only differences to certain steps being caused by the provision of the projection lens focus adjusting mechanism 133 as the adjusting mechanism for the projection parameters.

Since the automatic adjustment of the projection parameters in this fourth embodiment is performed using only one projector, as in the first embodiment, it is preferable for the positioning of the projector 100 and the settings, such as the axis displacement and zoom ratio, of the projection lens 101 to be roughly adjusted by the user before the automatic adjustment of the projection parameters is performed. The reasons for this are the same as in the first embodiment.

Figure 14:
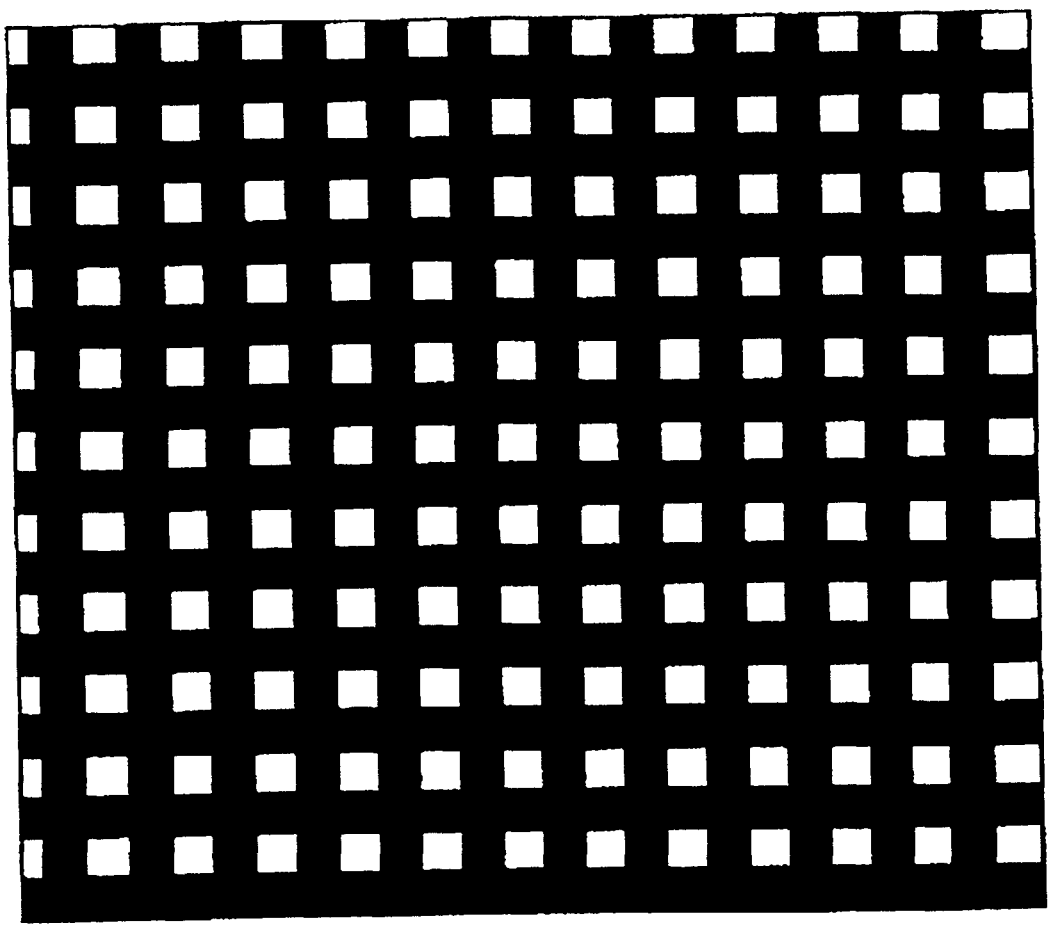
FIG. 14 shows an example of pattern C.

The processing in the present embodiment differs from the first embodiment in that in step S402, a mosaic pattern (hereafter, "pattern C") is displayed on the light valves 108~110 so that the projector 100 projects an image of pattern C onto the screen 200. An example of pattern C is shown in FIG. 14. When an image of this pattern is projected by the projector 100, the light reflected back off the screen 200 forms images on the light valves 108~110 of the projector 100. Since pattern C is also being displayed on the light valves 108~110, the intensity of the reflected light, which is to say, the output value of the A/D convertor 115, will be highest when the focus of the projection lens 101 has been suitably adjusted so that the patterns formed on the light valves 108~110 of the projector 100 by the reflected light coincide to the displayed pattern C. Note that when the focus of the projection lens 101 has not been properly adjusted, the image of pattern C projected onto the screen 200 will have blurred edges between the open parts and closed parts in the mosaic pattern. This results in part of the light reflected back from the screen 200 not being able to pass through the open parts of the light valves 108~110. The present embodiment is not limited to the pattern shown in FIG. 14, so that depending on the detection accuracy of the light detecting element 114, any pattern where there are edges between bright areas and dark areas can be used when automatically adjusting the focus.

For the above reasons, the processing in step S403 onwards is largely the same as the processing in the first embodiment, so that the focus of the projection lens 101 can be automatically adjusted by using a single projector. In more detail, in step S403 the projection lens focus adjusting mechanism 133 adjusts the focus of the projection lens 101 to a maximum value (here defined as either end of the range over which the focus of the projection lens 101 can be adjusted). The light source 111 is then switched on (S404), and the output value of the A/D convertor 115 at that point is obtained as the measurement P (S405). Note that a conventional device can be used as the projection lens focus adjusting mechanism 133, so that no explanation of such will be given.

The projection lens focus adjusting mechanism 133 reduces the focus setting by a predetermined amount (S406) and the output of the A/D convertor 115 at that point is obtained as the measurement Q (S407). This predetermined amount in step S406 can be any kind of value in the same way as in the first embodiment. When the measurement Q falls below the measurement P (S408:Yes), the focus adjustment processing is complete. If the measurement Q is not below the measurement P (S408:No), the adjustment by the projection lens focus adjusting mechanism 133 is repeated (S406, S409).

As with the preceding embodiments, the present embodiment has the advantages of lower cost and of easier operation for adjustment of the projection parameters over systems where a video camera is used.

Note that the sizes of the open parts of pattern C can be freely selected, and may be set at a fixed value or at a value that may be changed according to the operating conditions of the projector 100. There are also no particular restrictions governing the brightness of the open parts and the closed parts of the pattern. Also note that while S403 is described as setting the focus at a highest value and S406 as reducing this focus setting by a predetermined value, this adjustment may instead be performed in the other direction.

FIFTH EMBODIMENT

The following describes a fifth embodiment of the present invention. In this embodiment, the position (also referred to as the "focus") and inclination of each light valve with respect to the optical path taken by light from the light source 111 is automatically adjusted for the case when images are projected onto the screen using a single projector. Such adjustments are necessary since a three-chip projector like that of the present embodiment needs to have each light valve for the three colors of red, green, and blue positioned at an equal distance from the projection lens, and since it is preferable when forming an image on a screen for the light valves to have the same inclination as the screen.

Figure 15:
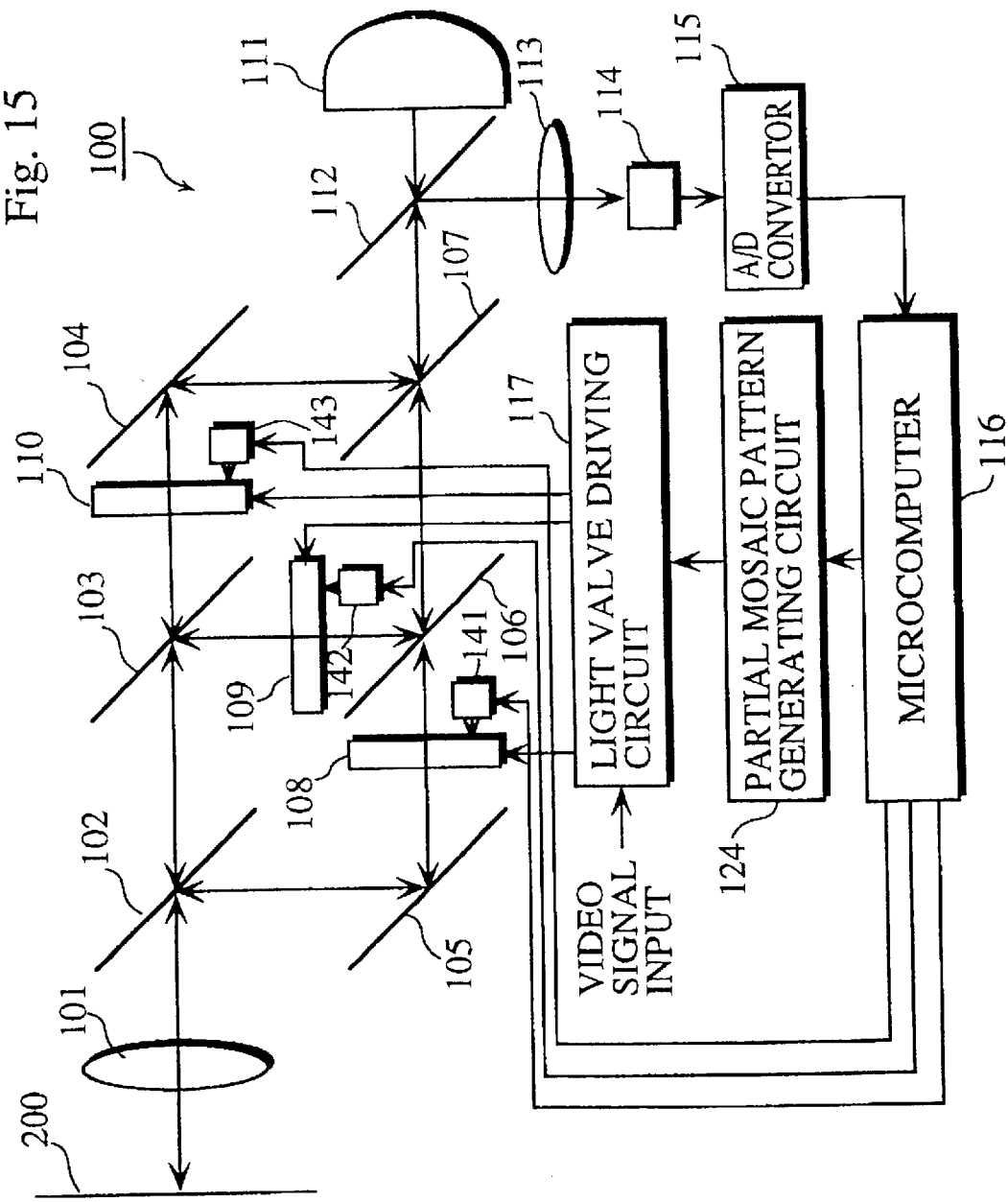
FIG. 15 shows the construction of the projector of the fifth embodiment.

FIG. 15 shows the construction of the projector 100 in this embodiment. As shown in FIG. 15, the present projector has largely the same construction as that described in the fourth embodiment. The differences with the fourth embodiment lie in the provision of the light valve position/inclination adjusting mechanisms 141, 142, and 143 in place of the projection lens focus adjusting mechanism 133 and in the provision of the partial mosaic pattern generating circuit 124 in place of the mosaic pattern generating circuit 123. The following explanation will focus on these differences.

Figure 16:
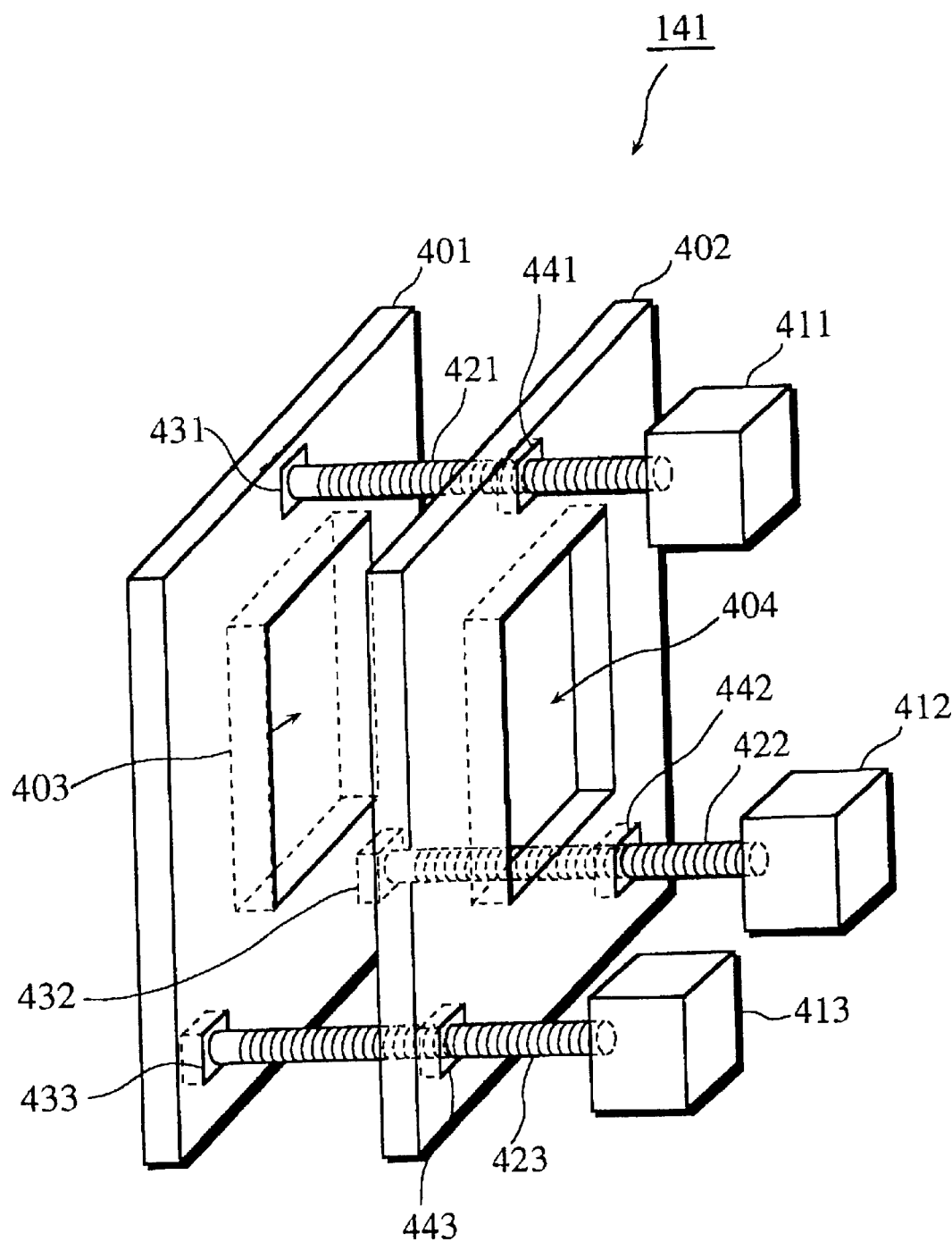
FIG. 16 is a perspective drawing that schematically shows the construction of the light valve position/inclination adjusting mechanism 141.

The following describes the construction of the light valve position/inclination adjusting mechanisms 141~143. Note that the light valve position/inclination adjusting mechanisms 141~143 are themselves conventional devices, such as those that allow adjustment by an experienced user who adjusts the light valves using a remote controller while viewing images on the screen. The light valve position/inclination adjusting mechanisms 141~143 each have the same construction, so that the following explanation will describe light valve position/inclination adjusting mechanism 141 as a representative of the three. FIG. 16 is a perspective drawing showing the construction of the light valve position/inclination adjusting mechanism 141 in schematic form.

In FIG. 16, numeral 401 denotes a fixed frame while numeral 402 denotes a movable frame. In this embodiment, the fixed frame 401 is attached to the case of the projector 100 and includes an empty window 403. The movable frame 402 includes the light valve attachment window 404, into which the blue image light valve 108 is attached. As one example, a liquid crystal display panel may be attached. This means that light from the light source 111 passes through the blue image light valve 108 that is attached in the light valve attachment window 404 and through the window 403 on its way toward the screen 200.

Figure 17A:
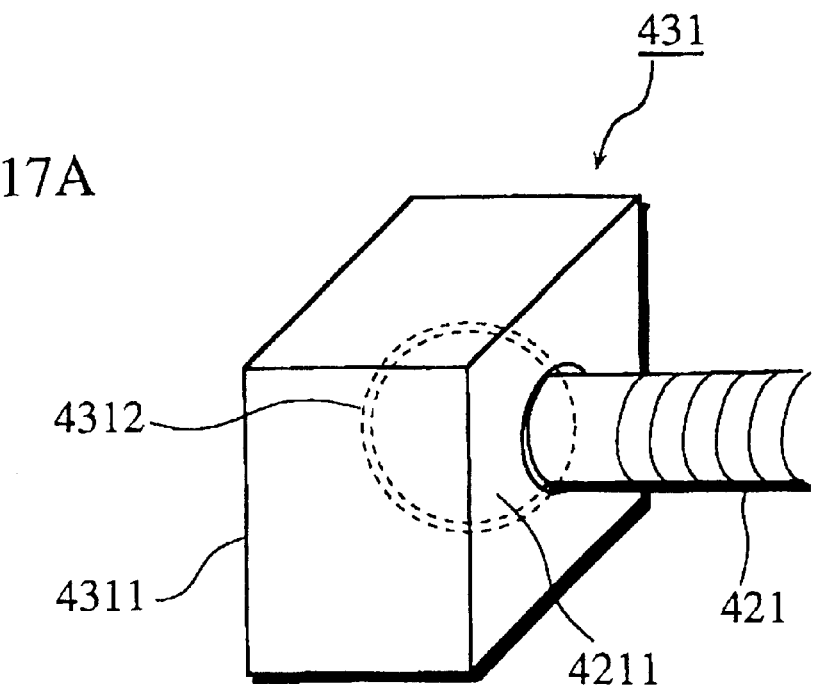

The light valve position/inclination adjusting mechanism 141 is equipped with three motors 411, 412, and 413. These motors 411~413 can rotate the screws 421~423 in both clockwise and anticlockwise directions. Components that are capable of positioning control, such as stepping actuators or DC motors equipped with revolution sensors, may be used as these motors 411~413. The screws 421, 422, and 423 are attached to the screw end holding mechanisms 431, 432, and 433 that are provided at three places in the fixed frame 401 to hold the ends of screws 421~423. These screws 421~423 are held so as to allow free rotation without their ends being able to move, with FIG. 17A showing an example construction of the screw end holding mechanism 431 that is capable of doing this. In FIG. 17A, a spherical socket is formed in the member 4311, and the screw 421 is attached to a ball 4211 that is provided inside the socket 4312.

Figure 17B:
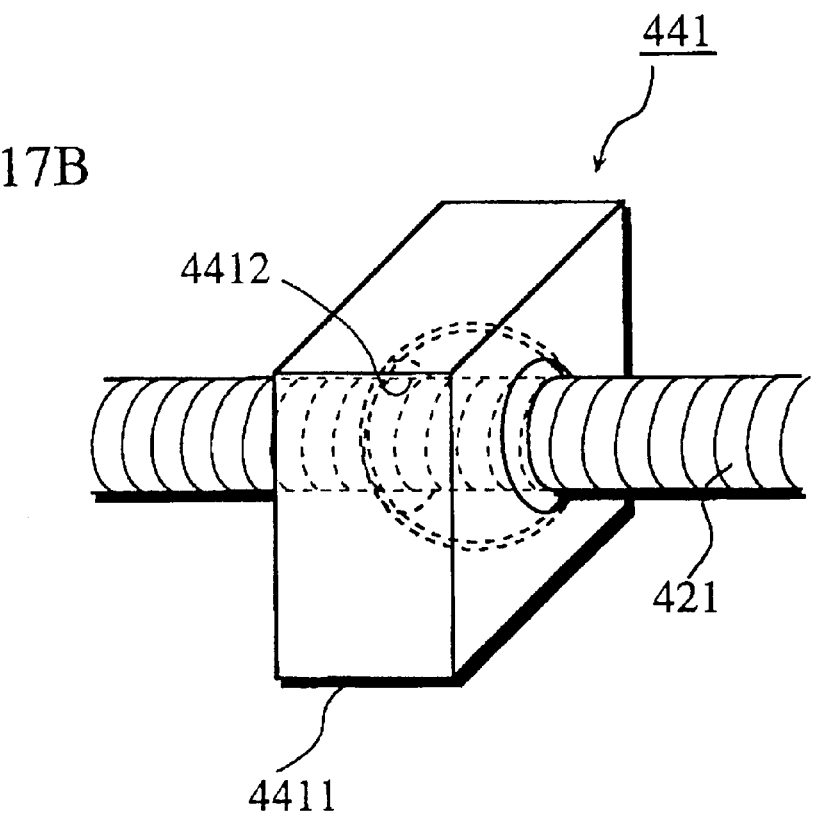
FIG. 17B shows an example construction of the screw attaching mechanism 441.

The movable frame 402 meanwhile includes screw attaching mechanisms 441, 442, and 443 at three places. FIG. 17B shows an example construction of the screw attaching mechanism 441. In FIG. 17B, the male thread cut into the surface of the screw 421 engages a female thread cut into a hole provided in a spherical member 4412 inserted into a spherical socket formed inside the external casing 4411 of the screw attaching mechanism 441. With the construction shown in FIG. 16, rotation of the screws 421~423 by the motors 411~413 can result in a change in the inclination of the blue image light valve 108 and in the distance between the movable frame 402 and the fixed frame 401. Here, the focus of the blue image light valve 108 can be adjusted by having the motors 411~413 perform the same rotation, while the inclination of the blue image light valve 108 can be adjusted by having the motors 411~413 rotate by different amounts.

Figure 18:
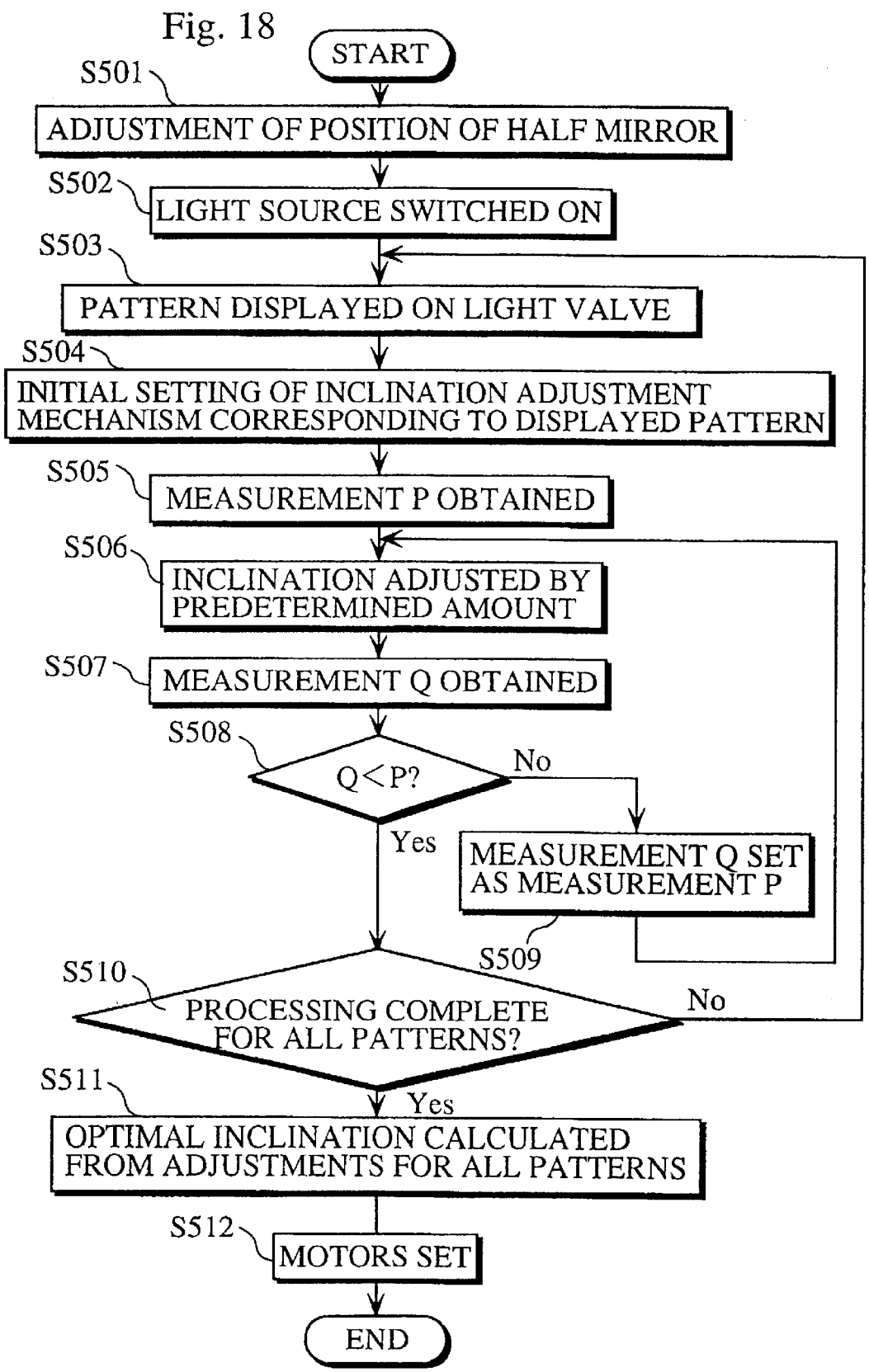
FIG. 18 is a flowchart showing the processing by the microcomputer 116 in the fifth embodiment of the present invention.
Figure 19:
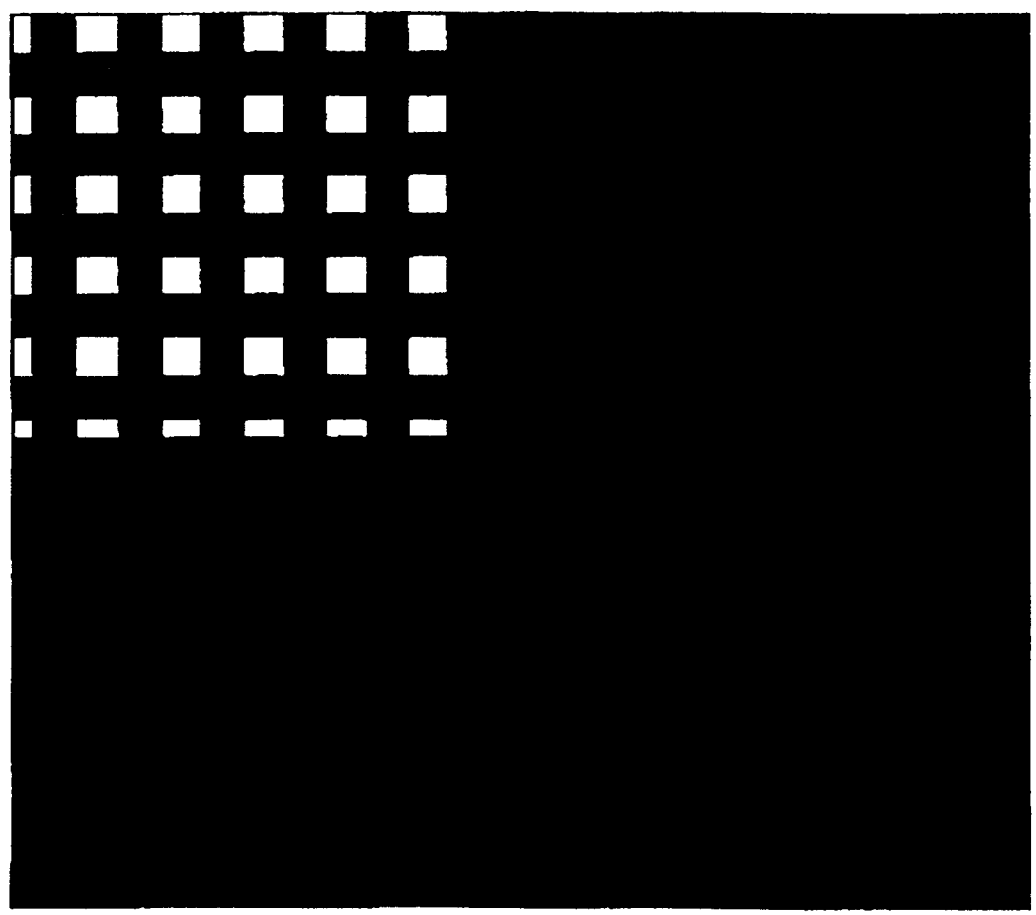
FIG. 19 shows an example of pattern D.
Figure 20:
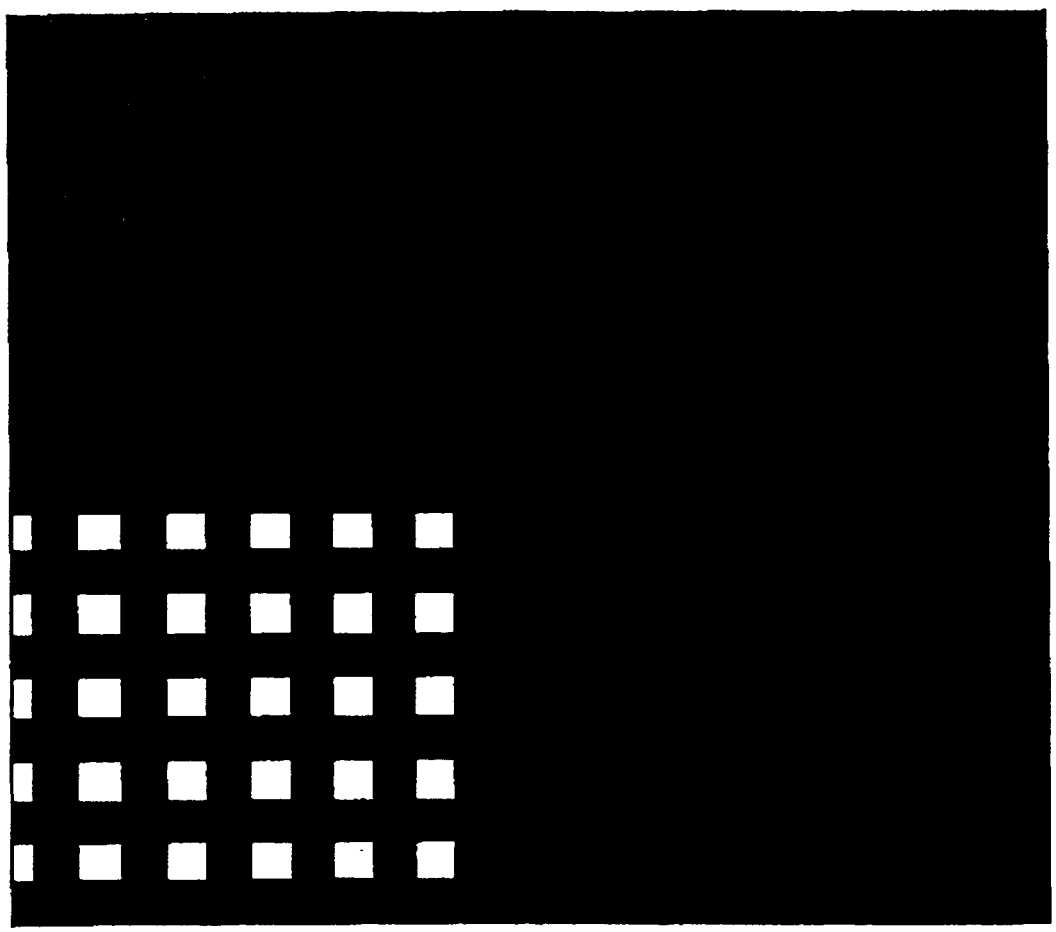
FIG. 20 shows an example of pattern E.
Figure 21:
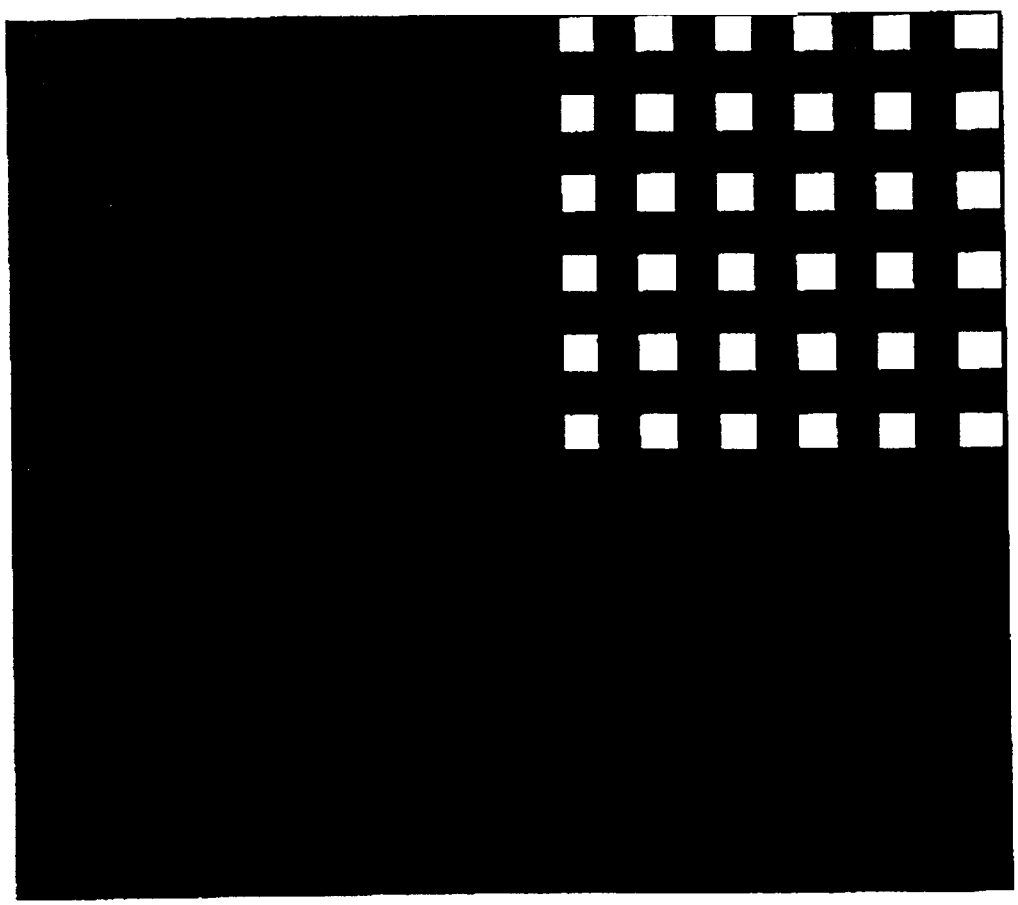
FIG. 21 shows an example of pattern F.
Figure 22:
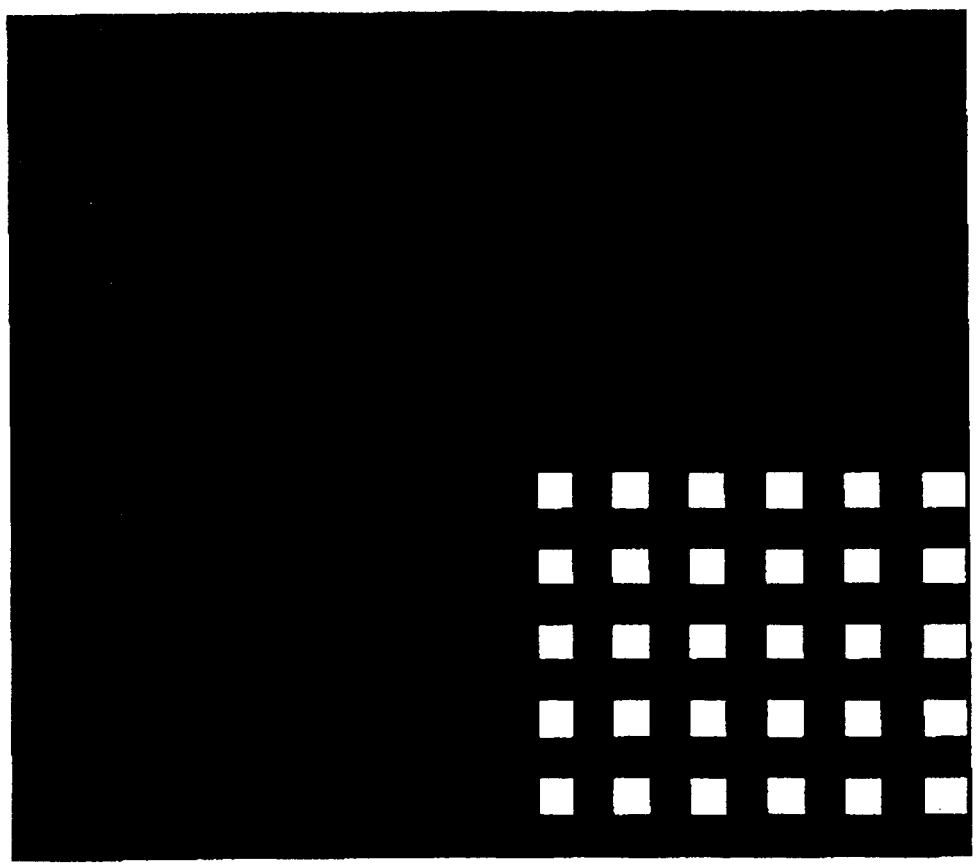
FIG. 22 shows an example of pattern G.

FIG. 18 is a flowchart showing the processing of the microcomputer 116 in this fifth embodiment. In this embodiment, the processing of the microcomputer 116 differs at many points to the processing described in the preceding embodiments. These are caused by the provision of the light valve position/inclination adjusting mechanisms 141~143 as mechanisms for adjusting the projection parameters, and result in changes to both the processing in individual steps and the processing as a whole.

Since the automatic adjustment of the projection parameters in the present embodiment is performed using only projector 100, for the same reasons as given in the first embodiment it is preferable for positioning of the projector 100 and the projection parameters of the projection lens 101 to be roughly adjusted before automatic adjustment is performed. The automatic adjustment of the projection parameters performed in the present embodiment also needs to be performed separately for each of the light valves 108~110, although the following explanation will only describe the adjustment of the blue image light valve 108 as a representative example. The same adjustment is performed for the light valves 109 and 110, and may be performed for the light valves 108~110 in any order.

The patterns used in the present embodiment are mosaic patterns that resemble pattern C, although this fifth embodiment differs from the fourth embodiment in that partial mosaic patterns, where a mosaic is present in only part of the patterns, are used to adjust the positions and inclinations of the light valves 108~110. These partial mosaic patterns are generated by the partial mosaic pattern generating circuit 124 shown in FIG. 15. Examples of patterns that may be used in the present embodiment are shown in FIGS. 19 through 22. For the sake of convenience, the pattern in FIG. 19 where a mosaic is present in only the top-left part is called pattern D, the pattern in FIG. 20 where a mosaic is present in only the bottom-left part is called pattern E, the pattern in FIG. 21 where a mosaic is present in only the top-right part is called pattern F, the pattern in FIG. 22 where a mosaic is present in only the bottom-right part is called pattern G. In the present embodiment, the optimal position and inclination of each of the light valves 108~110 is obtained for each of the above patterns and then the results are used to calculate the optimal settings for the motors 411~413. This procedure is described in detail below.

As shown in the flowchart of FIG. 18, the processing starts by appropriately positioning the half mirror 112 (S501). The light source 111 is then switched on (S502), and one of the four patterns D~G is displayed on the blue image light valve 108 that is to be adjusted first (S503). Assume here that pattern D is displayed. In this case, the light valves 109 and 110 that are not being adjusted are set so that their entire display areas are in the closed state. This setting into the closed state of the display areas of light valves that are not being adjusted is similarly performed when adjusting the green image light valve 109 and the red image light valve 110.

Adjustments for the positioning and inclination of can be obtained from the light reflected back off the projected images of the patterns due to the rationale explained in the preceding embodiments. In other words, when the projector 100 projects an image of pattern D, the light reflected back off the projected image on the screen 200 forms an image on the blue image light valve 108. Since the blue image light valve 108 is itself displaying pattern D, the optimal adjustment of the positioning and inclination of the blue image light valve 108 can be found by finding the maximum value of the intensity of the light that has been reflected off the screen 200 and through the blue image light valve 108, which is to say, the maximum value of the output of the A/D convertor 115.

When obtaining adjustment amounts for the positioning and inclination of a light valve for a pattern, first the setting of the light valve position/inclination adjusting mechanism 141 is initialized corresponding to the present pattern (S504). The details of this step are as follows. In the present embodiment, the initial setting of the light valve position/inclination adjusting mechanism 141, which is set in this step corresponding to the present pattern, is decided in advance. As one example, when pattern D with the mosaic in the top-left corner is displayed, the light valve position/inclination adjusting mechanism 141 is set so that the motor 412 is set at a value midway through its adjustable range, while the motors 411 and 413 are both set at their respective maximum values. In this explanation, this "maximum" value is the position in the adjustable range at which the movable frame 402 is closest to the fixed frame 401.

When pattern E with the mosaic in the bottom-left corner is displayed, the light valve position/inclination adjusting mechanism 141 is set so that the motors 411 and 412 are set at values midway through their adjustable ranges, while the motor 413 is set at its maximum value. When pattern F with the mosaic in the top-right corner is displayed, the light valve position/inclination adjusting mechanism 141 is set so that the motor 413 is set at values midway through its adjustable range, while the motors 411 and 412 are set at their respective maximum values. In the same way, when pattern G with the mosaic in the bottom-right corner is displayed, the light valve position/inclination adjusting mechanism 141 is set so that the motors 411 and 413 are set at values midway through their adjustable range, while the motor 412 is set at its maximum value.

Once the light valve position/inclination adjusting mechanism 141 has been set at the appropriate initial values, the output value of the A/D convertor 115 is obtained as the measurement P in the same way as in the preceding embodiments (S505). After this, the light valve position/inclination adjusting mechanism 141 changes the positioning and inclination of the blue image light valve 108 by a predetermined amount (S506). In the present embodiment, the predetermined amount used when adjusting the positioning and inclination using the pattern D can for example be an adjustment that reduces the setting of the motors 411 and 413, which are initially set at their maximum values, by a predetermined amount. When adjusting the positioning and inclination using other patterns, a predetermined reduction in the setting of the motor(s) which is/are set at its/their maximum value(s) can be made in the same way. In the present embodiment, the motors (for the case of pattern D, only motor 412) that are initially set at a midway value are not adjusted. As a result, the adjustment of the other motors changes the inclination of the blue image light valve 108 by a predetermined amount. Note that as in the preceding embodiments, there are no particular restrictions regarding the meaning of "predetermined" used here.

After making the above adjustment, the output value of the A/D convertor 115 is obtained as the measurement Q (S507). As in the preceding embodiments, the measurements Q and P are compared and the processing for obtaining an inclination/positioning adjustment amount for the present pattern ends if the measurement Q has fallen below the measurement P (S508:Yes). If this is not the case (S508:Yes), the adjustment processing of the light valve position/inclination adjusting mechanism 141 for the pattern D is repeated (S509, S506).

When the processing for pattern D ends (S508:Yes), it is judged whether the adjustment processing has been completed for every pattern from pattern D to pattern G (S510). Since this is not the case in the present example (S510:No), the processing returns to step S503, a pattern that has not been processed (such as pattern E in the present example) is displayed on the blue image light valve 108 (S503), and adjustment of the inclination of the blue image light valve 108 is performed for this pattern.

On the other hand, when the adjustment processing has been performed for every pattern (S510:Yes), the optimal inclination is calculated from the adjustment results that the preceding processing obtained for each pattern (S511). One method for calculating this optimal inclination in step S511 is described below.

Figure 23:
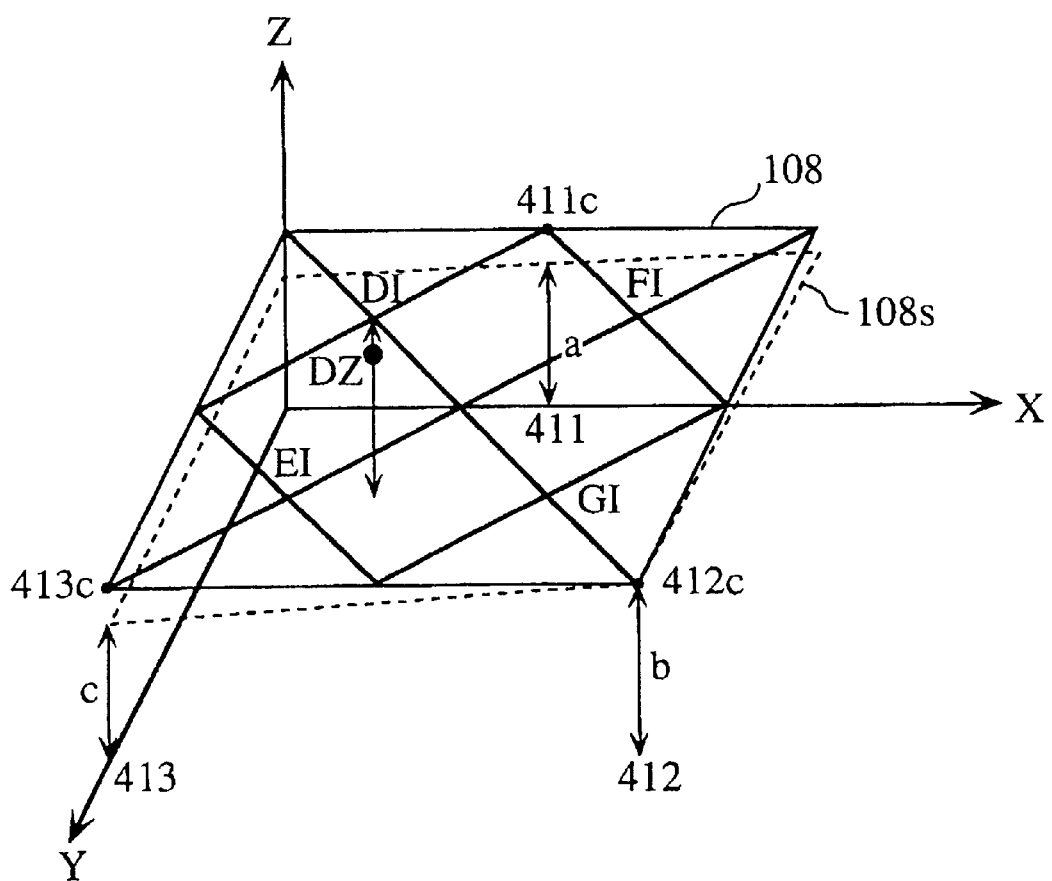
FIG. 23 is a figure that is referred to in the explanation of the method for calculating the optimal position/inclination in the fifth embodiment.
Figure 24:
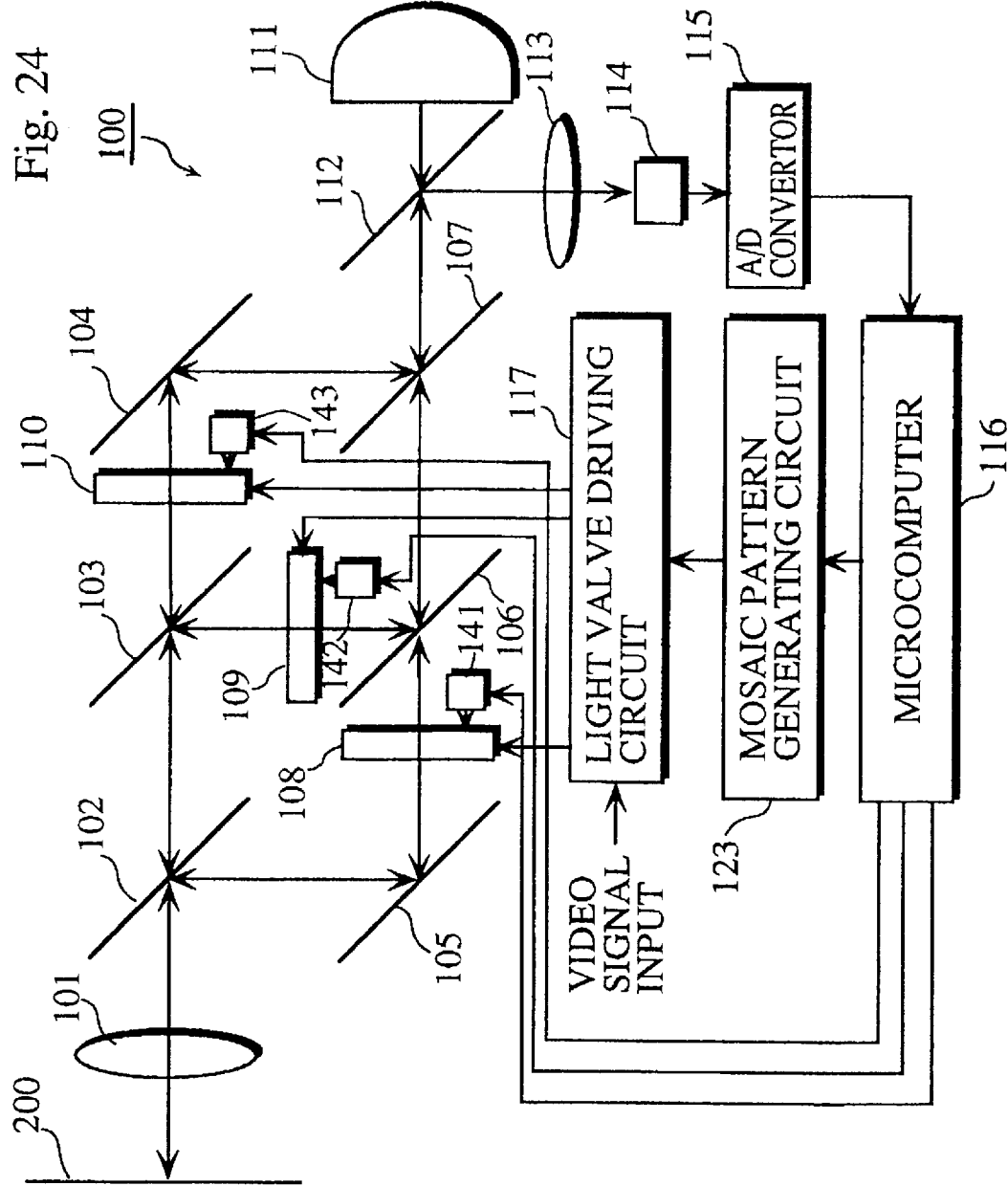
FIG. 24 shows the construction of the projector of the sixth embodiment.

FIG. 23 is a representation of this calculating method. In this figure, the parallelogram 108 drawn with a solid line shows a model representation of the position and inclination of the blue image light valve 108 when the motors 411~413 are set at midway points 411c~413c in their respective adjustable ranges. The arrows a, b, and c show the respective directions in which the motors 411, 412, and 413 can adjust the position and inclination of the movable frame 402.

The following explanation deals with the case when adjustment values are obtained using the pattern D. The settings of motors 411 and 413 are progressively reduced from their maximum values so that the inclination and position of the blue image light valve 108 reach the position surrounded by the broken line 108s in FIG. 23 where the measurement Q falls below the measurement P. The coordinates of the point DZ are found from the settings of the motor 411 and the motor 413 at this point. This point DZ is the intersection between a normal extending from the point DI toward the XY plane in FIG. 23 and the plain 108s where the inclined blue image light valve 108 is shown by a broken line. If the motors 411~413 are set at the center points 411c~413c in their respective adjustable ranges, this point DI is the intersection between a line that joins the center points of two predetermined edges of the blue image light valve 108 and a predetermined diagonal line, and roughly matches the center of the mosaic part of pattern D. The coordinates (dx, dy, dz) of the point DZ are obtained as the position/inclination adjustment values for the pattern D.

Coordinates are also obtained in the same way using the other patterns. When using pattern E, the same method is used to obtain the coordinates (ex, ey, ez) of the point EZ (not illustrated) when the measurement Q falls below the measurement P. This point EZ is the intersection between a normal extending from the point shown as EI (an intersection between a line that joins the center points of two predetermined edges and a predetermined diagonal line) toward the XY plain and the inclined blue image light valve 108 during adjustment. The same goes for the coordinates (fx, fy, fz) of the point FZ and the coordinates (gx, gy, gz) of the point GZ.

It is assumed here that the optimal adjustment of the position and inclination of the blue image light valve 108 includes four points expressed by the following coordinates. In other words, the standard value S for optimizing the positioning and inclination of the light valve can be defined by Expression 1 below, with these four points given as DZ' (dx, dy, dz'), EZ' (ex, ey, ez'), FZ' (fx, fy, fz'), and GZ' (gx, gy, gz').

$$S=\Delta dz^2+\Delta ez^2+\Delta fz^2+\Delta gz^2 \qquad \text{Expression 1}$$

where $\Delta dz^2=(dz-dz')^2$
$\Delta ez^2=(ez-ez')^2$
$\Delta fz^2=(fz-fz')^2$
$\Delta gz^2=(gz-gz')^2$ If the set (dz', ez', fz', gz') of numbers that minimizes the standard value S is found, a plain including the blue image light valve 108 after optimal adjustment of positioning and inclination can be found. As a result, the optimal settings of the motors 411~413 can be determined. These settings are made in step S512 in the flowchart in FIG. 18, thereby achieving the automatic adjustment of the positioning and inclination of the blue image light valve 108.

The processing described using FIG. 18 is also performed for the green image light valve 109 and the red image light valve 110, so that the inclination and positioning of all the light valves 108~110 are automatically adjusted.

As with the preceding embodiments, the present embodiment has the advantages of lower cost and of easier operation for adjustment of the projection parameters over systems where a video camera is used. Note that while step S503 is described in the present embodiment as using initial settings of the maximum value for motors 411 and 413 and step S506 as decreasing these settings by predetermined values, the opposite may be the case, so that the minimum values may be set for these motors in step S503 and the settings thereafter progressively increased by predetermined amounts in step S506.

Note also that while step S503 is described as fixing the setting of the motor 412 at the midpoint of the adjustable range, this setting may be fixed at a different point, or may itself be changed. If the initial settings of the motors 411 and 413 are the maximum values in the adjustable ranges, the initial value of the motor 412 may be set as the minimum value in the adjustable range, with the setting of the motor 412 being increased by a predetermined amount when the settings of the motors 411 and 413 are decreased by the predetermined amounts. In other words, a variety of methods may be used.

Finally, step S511 of the present embodiment is not limited to the method for calculating the standard value S that was shown by Expression 1. Other methods are possible, so that depending on the settings and other factors, a method that improves the precision of the settings can be used.

SIXTH EMBODIMENT

The following describes a sixth embodiment of the present invention. In this embodiment, the focus of each light valve is automatically adjusted for the case when images are projected onto the screen using one projector. Note that it is believed that the adjustment described in this embodiment will often not be required if the inclination and position of the light valves have been adjusted using the method described in FIG. 5. This is because the focus adjustment of the light valves in the present embodiment is performed by having each of the motors 411~413 move by a same predetermined amount to adjust the position of each light valve relative to the optical axis of the light from the light source 111, which will often be achieved when adjusting the positioning of the light valves in the method of the fifth embodiment. Once adjustment has been performed according to the method described in the fifth embodiment, the method in the present embodiment can be used to make fine adjustments to the foci of the light valves while maintaining their optimized inclinations.

The projector 100 of this sixth embodiment has the construction shown in FIG. 15, which is almost the same as that described in the fifth embodiment. Since the present pattern uses pattern C of the fourth embodiment that is completely covered by a mosaic pattern, the present projector 100 includes the mosaic pattern generating circuit 123 in place of the partial mosaic pattern generating circuit 124. The automatic adjustment of the foci of the light valves in the present embodiment by the light valve position/inclination adjusting mechanisms 141~143 is fundamentally the same as the automatic adjustment of the positioning and inclination of the light valves in the fifth embodiment, except that the settings of the motors 411~413 are always changed uniformly. Due to this difference, the processing by the microcomputer 116 in the sixth embodiment differs to that in the fifth embodiment, with the following explanation focusing on these differences.

Figure 25:
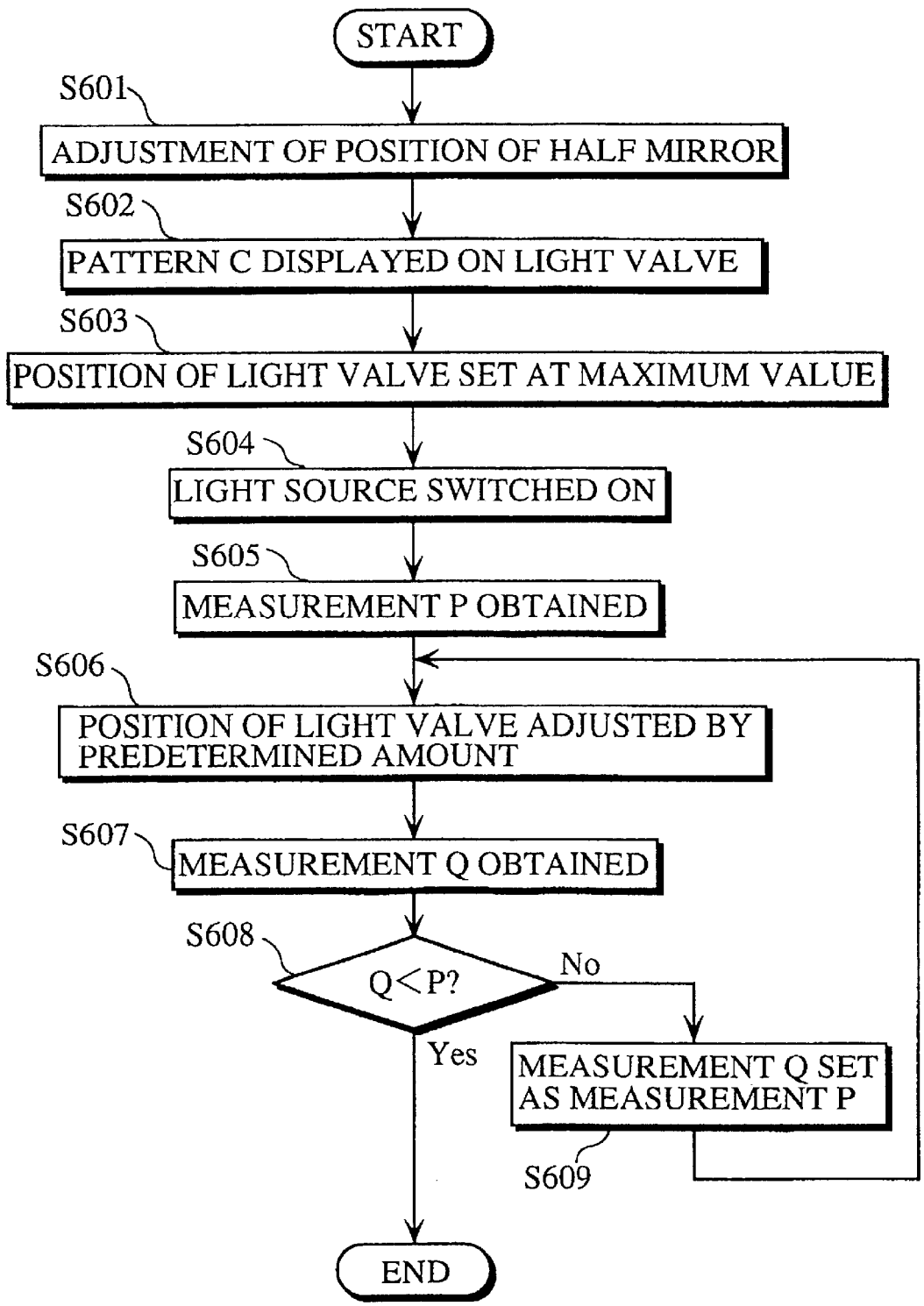
FIG. 25 is a flowchart showing the processing by the microcomputer 116 in the sixth embodiment of the present invention.

FIG. 25 is a flowchart showing the processing of the microcomputer 116 in the present embodiment. In the same way as in the fifth embodiment, the adjustment of the positioning has to be performed separately for each light valve, with the following explanation dealing with the example of the blue image light valve 108. The green image light valve 109 and the red image light valve 110 are adjusted in the same way, with the order for adjusting the light valves being arbitrary. As shown in FIG. 25, the processing of the microcomputer 116 in the present embodiment is closer to the processing in the first~fourth embodiments than the processing in the fifth embodiment. However, the present embodiment has some slight differences with the first~fourth embodiments that are caused by the adjustment of the foci of the light valves 108~110 using the light valve position/inclination adjusting mechanisms 141~143. Note that since the automatic adjustment of the projection parameters performed in the present embodiment is achieved with only one projector as in the fifth embodiment, it is preferable for the positioning of the projector and the other projection parameters to be roughly adjusted before automatic adjustment of the projection parameters is performed. The reasons for this are the same as those given in the first embodiment.

In the flowchart of FIG. 25, the microcomputer 116 of the first embodiment first adjusts the positioning of the half mirror 112 (S601). Since the projector 100 is to project an image of pattern C, this pattern is displayed on the blue image light valve 108 (S602). The reason pattern C is used is that the adjustment performed in the present embodiment is an adjustment of the light valves 108~110 in the direction of the optical path of the light from the light source 111, which is to say, an adjustment of the distances from the light valves 108~110 to the projection lens 101, or in other words, an adjustment of the foci of the light valves 108~110. As a result, the same pattern, pattern C, that was used for the adjustment of the focus of the projection lens 101 in the fourth embodiment can be used. When pattern C is used, the intensity of the light reflected back off the screen 200 and through the blue image light valve 108, which is to say the output of the A/D convertor 115, will be greatest when the focus of the blue image light valve 108 has been optimally adjusted. Note that when adjustment is being performed for the blue image light valve 108, totally closed patterns are displayed on the green image light valve 109 and the red image light valve 110, as in the fifth embodiment.

Next, the microcomputer 116 sets the position of the blue image light valve 108 at its maximum value (S603), and switches on the light source 111 (S604). This means that each of the motors 411~413 of the light valve position/inclination adjusting mechanism 141 is set so that the movable frame 402 is positioned at a closest position to the fixed frame 401. After this, the output value of the A/D convertor 115 is obtained as the measurement P (S605).

The microcomputer 116 then has the light valve position/inclination adjusting mechanism 141 decrease its setting by a predetermined amount (S606). This means that the motors 411~413 each rotate by a same predetermined amount to move the movable frame 402 a predetermined distance away from the fixed frame 401. As in the preceding embodiments, the "predetermined" of "predetermined distance" has no particular meaning. The output value of the A/D convertor 115 at this point is obtained as the measurement Q (S607). As in the preceding embodiments, when the measurement Q has fallen below the measurement P (Step S608:Yes), the adjustment of the position of the blue image light valve 108 is complete. When this is not the case, (S608:No), the adjustment by the light valve position/inclination adjusting mechanism 141 is repeated (S609, S606).

The above processing completes the adjustment of the position (focus) of the blue image light valve 108, and is then repeated for the green image light valve 109 and the red image light valve 110, thereby adjusting the foci of all the light valves 108~110.

As with the preceding embodiments, the present embodiment has the advantages of lower cost and of easier operation for adjustment of the projection parameters over systems where a video camera is used. While there is a possibility of the processing of the present embodiment being less precise than that of the fifth embodiment, the present embodiment has the advantages such as (1) there being no need for complex calculations to specify the planes in which the light valves should be set, and (2) the ability to reduce the number of motors in each light valve position/inclination adjusting mechanism by one allows this technology to be used even in low cost projectors. Depending on the operating conditions, this present embodiment can still obtain a sufficient degree of precision.

SEVENTH EMBODIMENT

The following describes a seventh embodiment of the present invention. This embodiment is a method for automatically adjusting the convergence of a projector when images projected by two projectors are combined on a screen.

Figure 26:
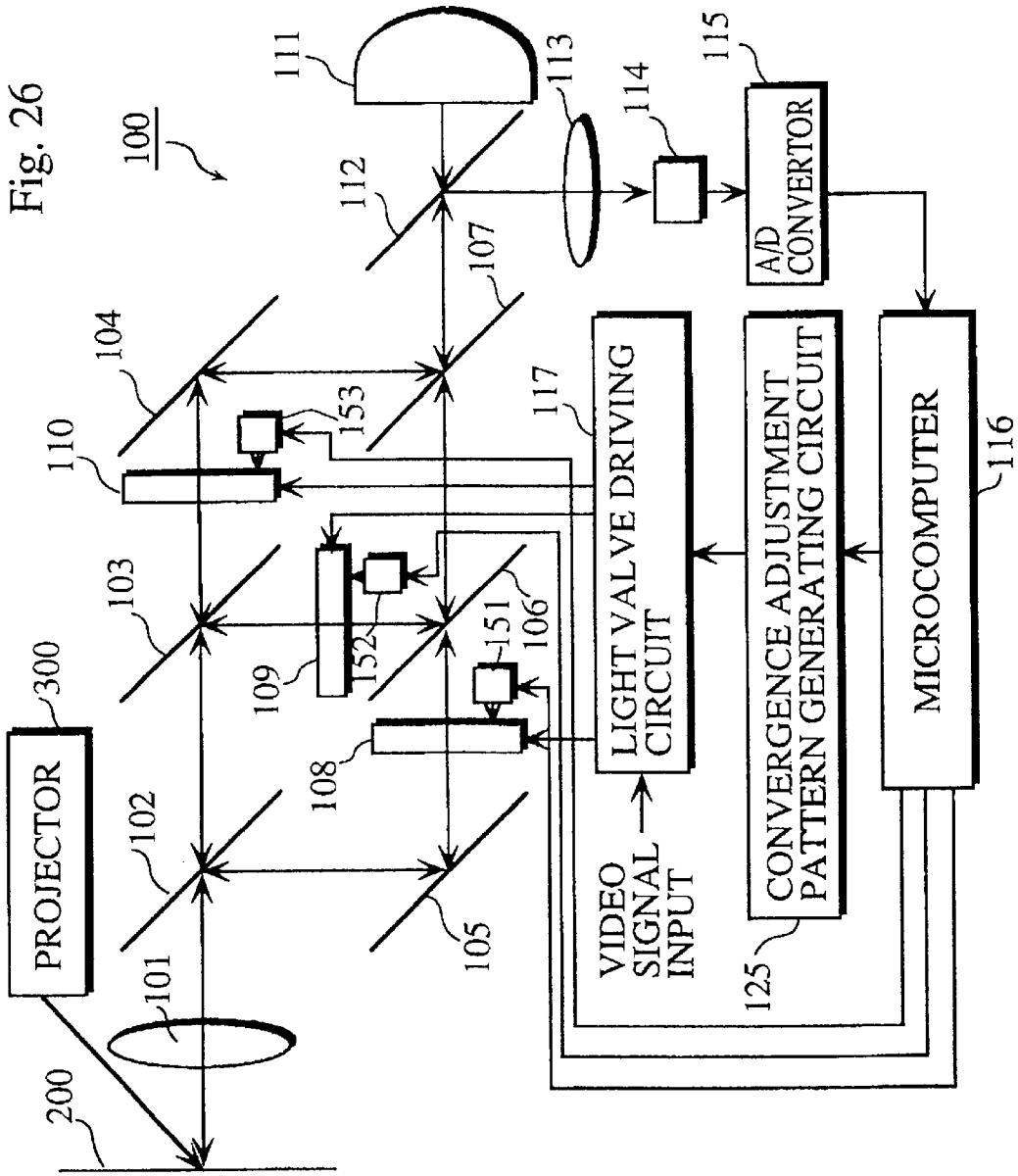
FIG. 26 shows the construction of the projector of the seventh embodiment.

FIG. 26 shows the construction of the projector 100 in this embodiment. As shown in FIG. 26, the present projector has largely the same construction as that described in the fifth embodiment that was shown in FIG. 15. However, the present embodiment differs from the fifth embodiment in have the convergence adjusting mechanisms 151, 152, and 153 respectively provided for the light valves 108, 109, and 110 in place of the light valve position/inclination adjusting mechanisms 141, 142, and 143. The automatic adjustment performed in this embodiment has convergence adjusted for the projector 100 with a pattern projected by a different projector 300 as the standard pattern. This pattern projected onto the screen 200 by the projector 300 and the processing by the microcomputer 116 differ somewhat to the preceding embodiments, so that the following explanation will focus on these differences.

Figure 27:
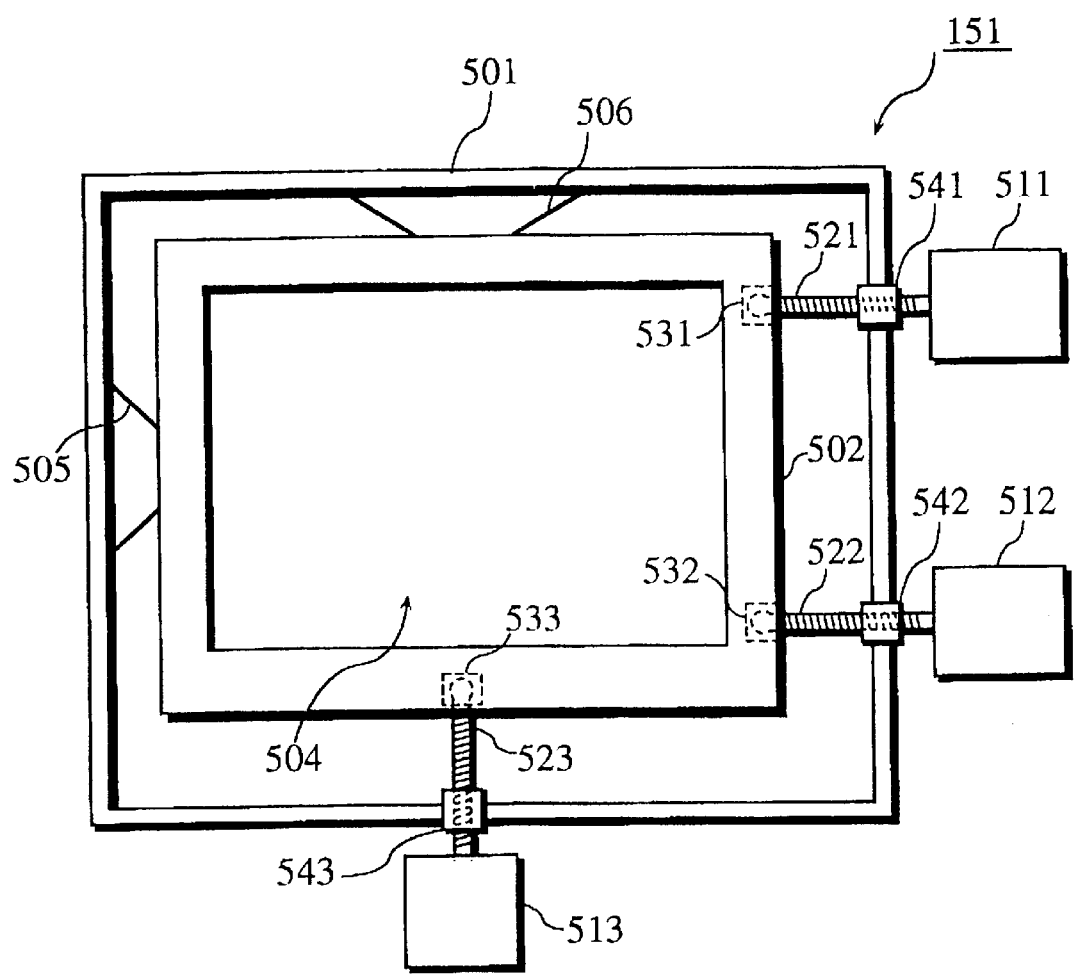
FIG. 27 is a front elevation that schematically shows an example construction of the convergence adjusting mechanism 151.

The following describes one example of the construction of the convergence adjusting mechanisms 151, 152, and 153. The convergence adjusting mechanisms 151~153 are themselves conventional devices, and are normally used, like the light valve position/inclination adjusting mechanisms 141~143, when the user performs a manual adjustment using a remote controller based on an visual assessment of the projected image. These convergence adjusting mechanisms 151~153 each have the same construction, so that only convergence adjusting mechanism 151 will be described. FIG. 27 is a front elevation of one example construction of the convergence adjusting mechanism 151 shown in schematic form.

As shown in FIG. 27, the movable frame 502 is provided inside the fixed frame 501. The blue image light valve 108 is attached to the light valve attachment window 504 provided on the inside of the movable frame 502. A liquid crystal display can be used to realize the blue image light valve 108. Elastic bodies 505 and 506, which can be springs, are provided between the movable frame 502 and the fixed frame 501, to hold the movable frame 502 in an almost fixed position which can be adjusted in the horizontal and vertical directions. This is described in more detail later in this embodiment. With this construction, light from the light source 111 enters the light valve attachment window 504 at an almost perpendicular angle and so passes through the blue image light valve 108 attached therein.

Figure 28:
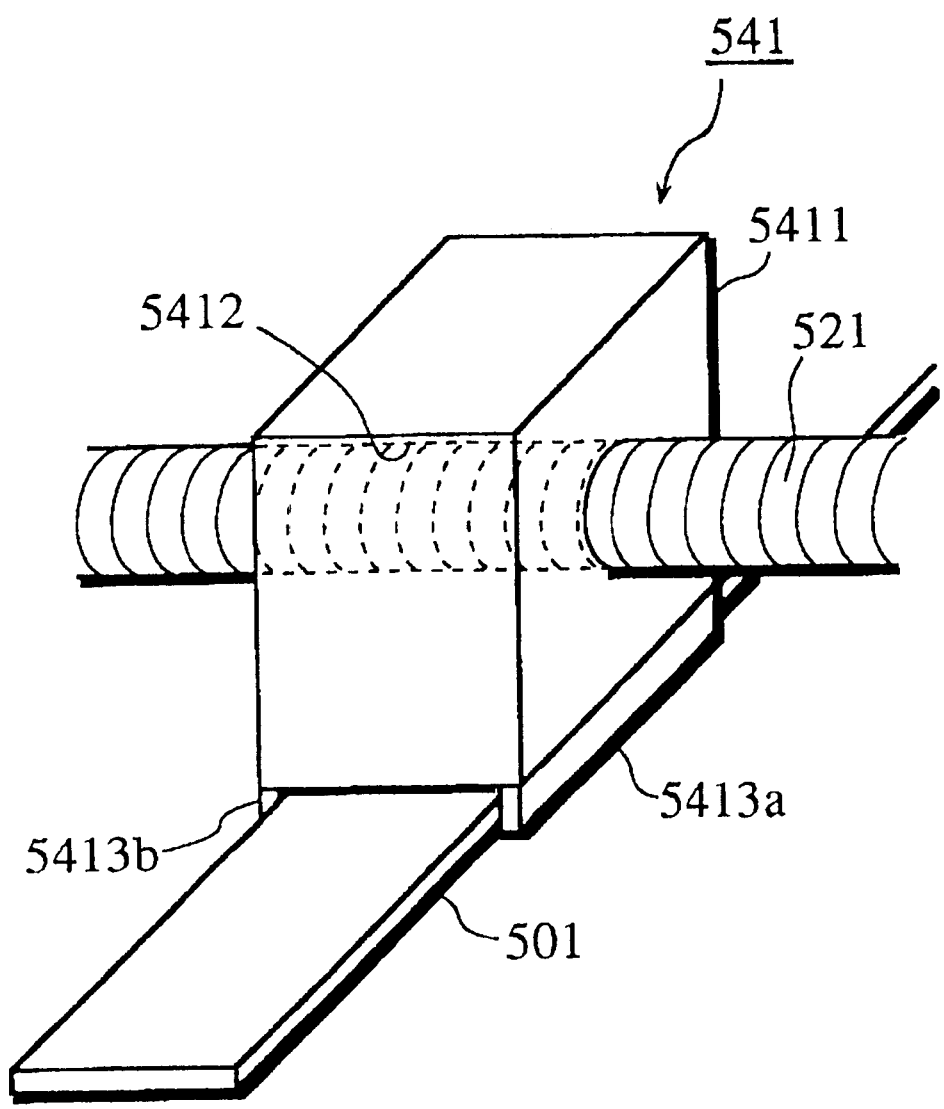
FIG. 28 shows an example construction of the central position holding mechanism 541.

The convergence adjusting mechanism 151 of the present embodiment also includes the motors 511, 512, and 513 that are capable of positioning control and the screws 521, 522, and 523 that can be respectively rotated both clockwise and anti-clockwise by the motors 511, 512, and 513. The convergence adjusting mechanism 151 is constructed so that the position of the movable frame 502 can be controlled by rotating of these screws 521, 522, and 523. The ends of the screws 521~523 are held by screw end holding mechanisms 531~533 that have a similar construction to the screw end holding mechanism 431 (shown in FIG. 17A) that was described in the fifth embodiment, so that the screws 521~523 are only capable of movement in the directions used for adjusting convergence. Central positions of the screws 521~523 are also held by the central position holding mechanisms 541~543, which can have a construction such as that shown in FIG. 28. As a result, the position of the movable frame 502 can be controlled by rotating the motors 511~513.

Note that since the end positions of the screws 521~523 are variable, actuators, such as linear stepping actuators, can be used as the motors 511~513.

The central position holding mechanism 541 of the present embodiment (the central position holding mechanisms 542 and 543 are the same, and so will not be described) has an external case 5411 into which a female thread 5412 for engaging the screw 521 has been cut. When the screw 521 is rotated by the motor 511, this results in the front end of the screw 521 moving forward or backward. Note that in the present embodiment, guide members 5413a and 5413b are provided between the central position holding mechanism 541 and the fixed frame 501, so that the central position holding mechanism 541 can be slid along the fixed frame 501 without being moved in any other direction. However, the central position holding mechanism 541 is not limited to this structure, so that as one alternative, a fairly large hole may be provided in the external case 5411 and another member including the female thread may be provided in a movable state within this hole. Also, while the motors 511~513 need to be disposed so as to allow movement in the same direction as the corresponding central position holding mechanisms 541~543, suitable constructions for achieving this are already conventionally available, so that no description of such will be given.

Figure 29:
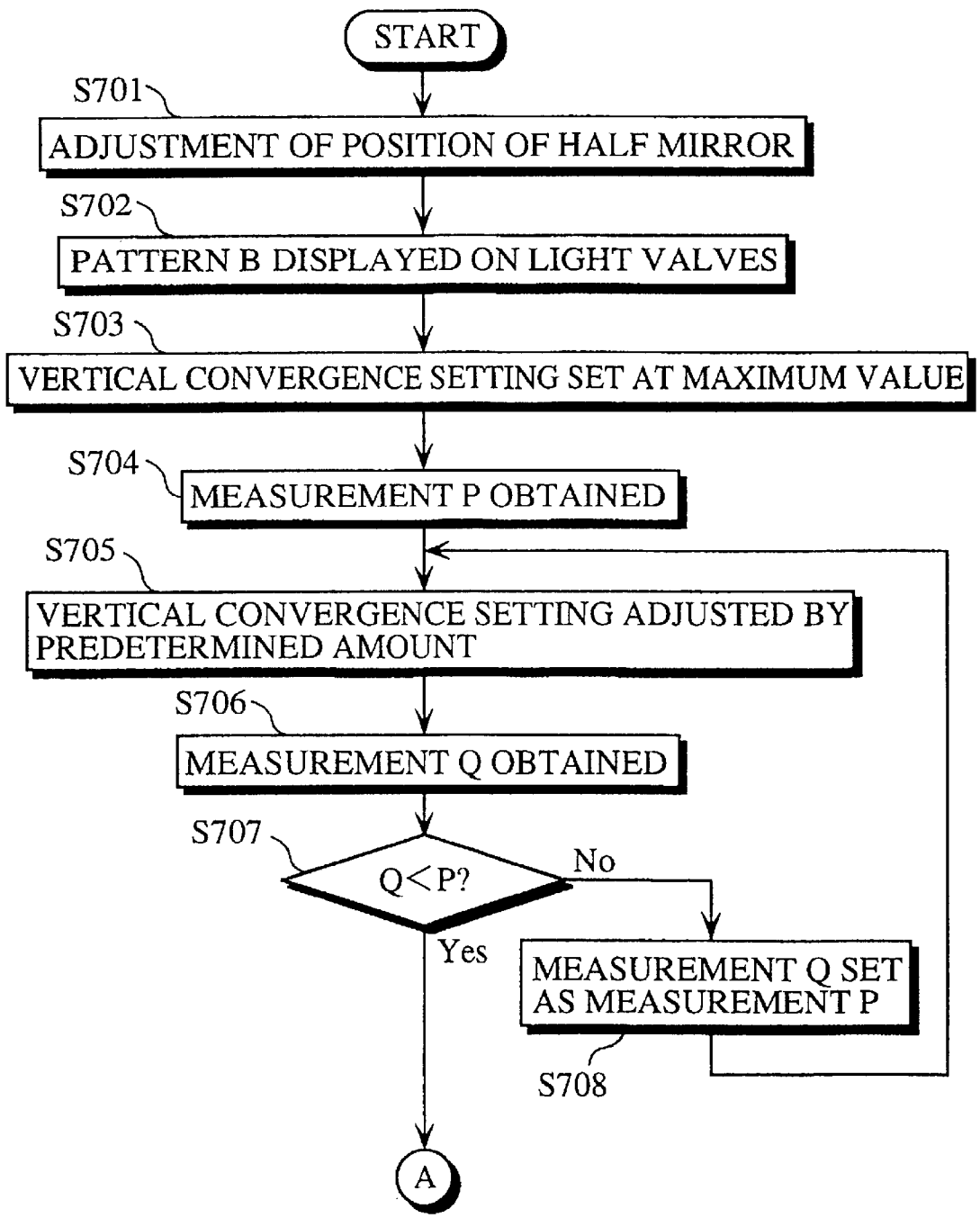
FIG. 29 and FIG. 30 are flowcharts showing the processing by the microcomputer 116 in the sixth embodiment of the present invention.
Figure 30:
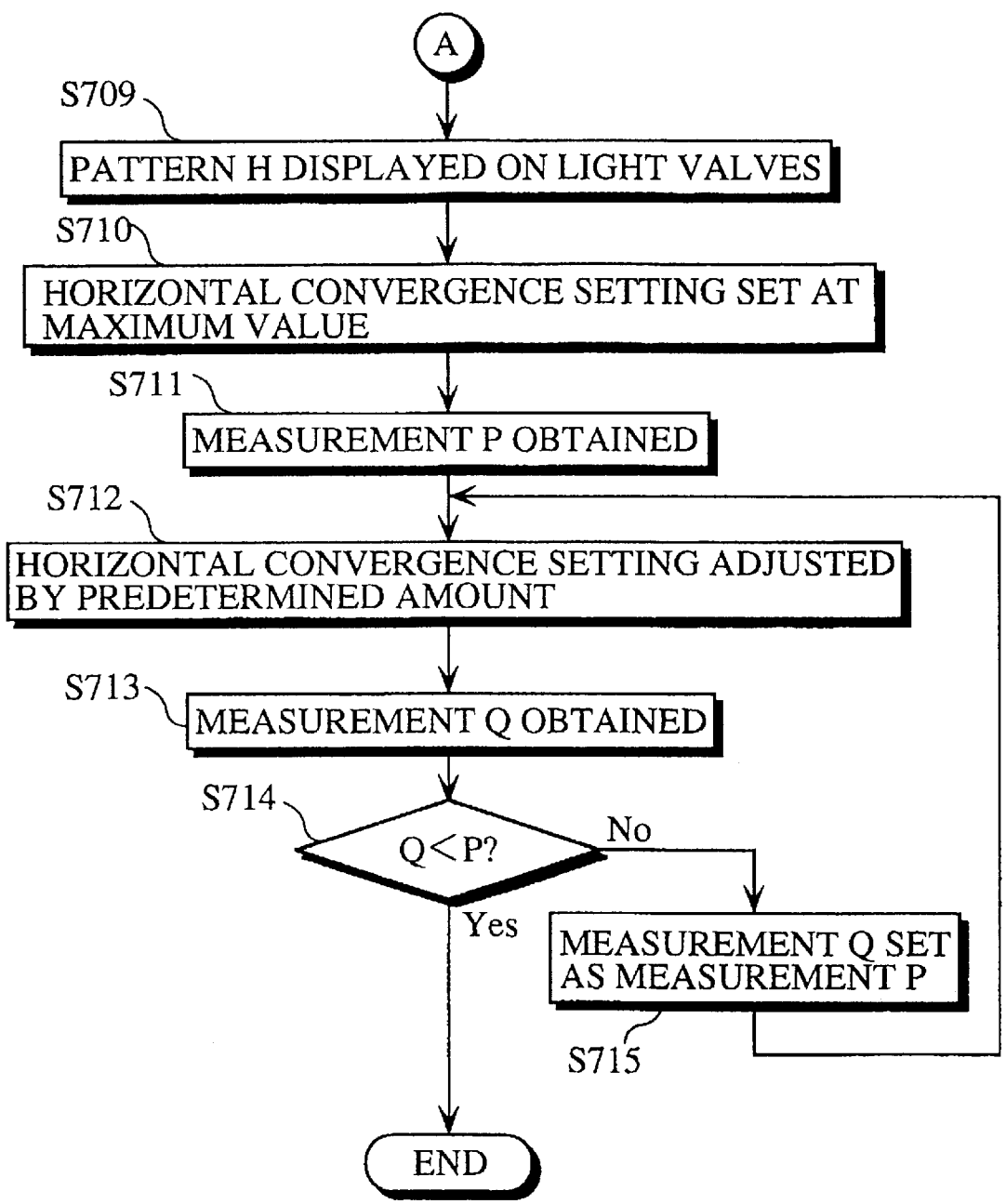

FIGS. 29 and 30 are flowcharts showing the processing of the microcomputer 116 in the present embodiment. The microcomputer 116 of the present embodiment needs to adjust the convergence of each of the light valves 108~110 in both the horizontal and vertical directions, although since the processing for each light valve 108~110 is the same, the following will only describe the processing for the blue image light valve 108. The adjustment of convergence for the green image light valve 109 and the red image light valve 110 is performed in the same way. The processing for adjusting convergence in the vertical direction is shown in FIG. 29, and that for adjusting convergence in the horizontal direction is shown in FIG. 30.

The following describes the processing for adjusting convergence in the vertical direction, with reference to FIG. 29. Since the processing for adjusting the projection parameters uses two projectors in the present embodiment, most of the processing for adjusting convergence in the vertical direction coincides with the processing of the second embodiment that was shown by the flowchart in FIG. 8. However, the processing content of certain steps differs due to the automatic adjustment of the projection parameters performed in the present embodiment being a positional adjustment of the light valves 108~110 using the convergence adjusting mechanisms 151~153.

Figure 31:
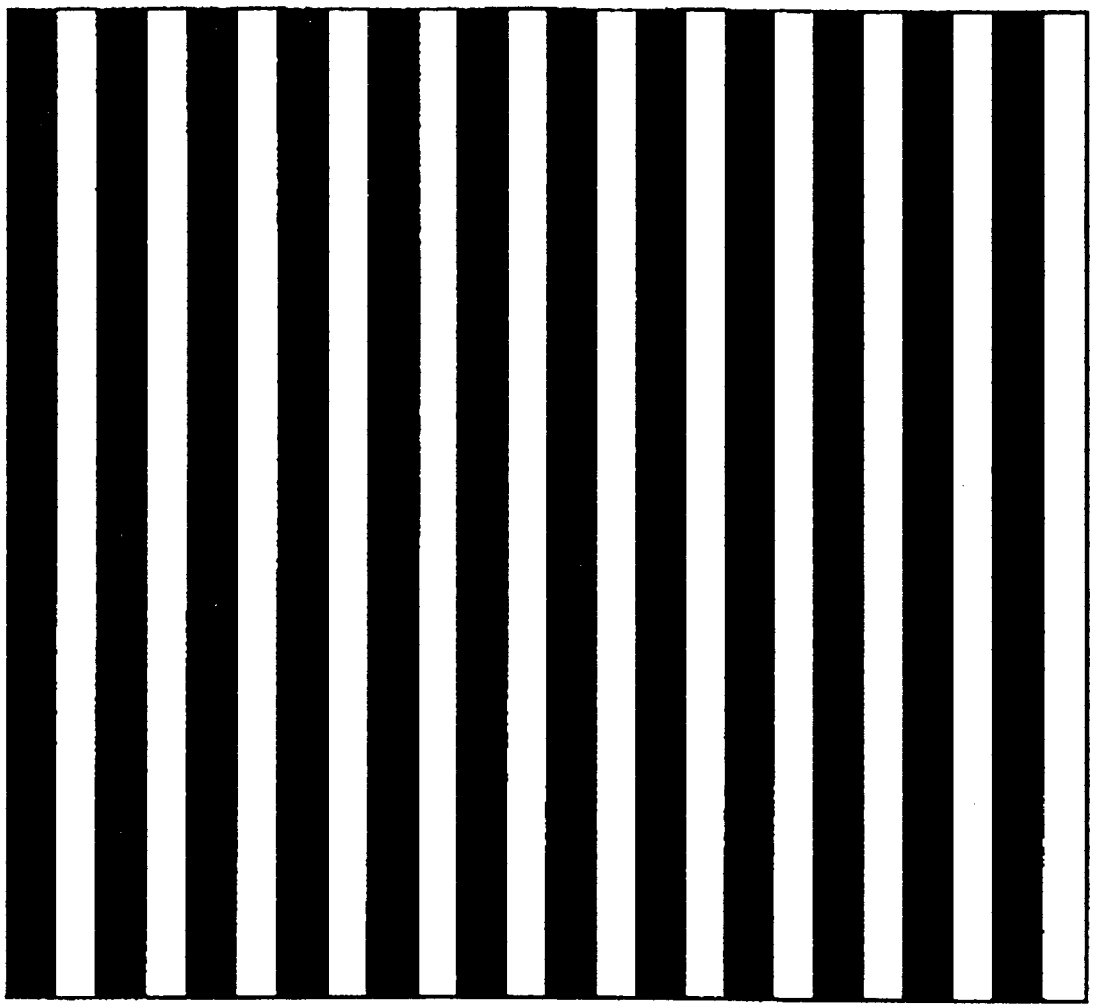
FIG. 31 shows an example of pattern F.

The automatic adjustment of the projection parameters in the present embodiment is performed using the projector 300 in addition to the projector 100. Accordingly, for the reasons given in the second embodiment, it is preferable for the positioning of these projectors and the projection parameters to be roughly adjusted before the automatic adjustment of the projection parameters is performed. Note that the present embodiment uses the same horizontal stripe pattern (pattern B) as the third embodiment when adjusting convergence in the vertical direction and a vertical stripe pattern (called "pattern H"), such as that shown in FIG. 31, when adjusting convergence in the horizontal direction. The displaying of these patterns is controlled by the convergence adjustment pattern generating circuit 125. The logic behind the use of these patterns is the same as in the preceding embodiments, so that no further explanation will be given.

Returning to the flowchart in FIG. 29, the microcomputer 116 of this seventh embodiment first positions the half mirror 112 as shown in FIG. 3A, so that the light detecting element 114 can detect the intensity of the light reflected back off the screen 200 (S701). Next, pattern B is displayed on the blue image light valve 108 (S702), and the motor 513 of the convergence adjusting mechanism 151 is rotated to set the adjustment value of the vertical convergence at its maximum value (S703). Here, the maximum value of adjustment value of the vertical convergence is set as the position in the vertically adjustable range of the movable frame 502 where the movable frame 502 is positioned furthest from the motor 513. Note that the projector 300 is projecting an image of pattern B onto the screen 200 at this point. Provided that it starts before step S704, this projecting can be commenced at any time in the processing. Also, while the blue image light valve 108 is being adjusted, patterns that are entirely closed are displayed on the green image light valve 109 and the red image light valve 110.

While the projector 300 is projecting an image of pattern B, the microcomputer 116 obtains the output value of the A/D convertor 115 as the measurement P (S704). After this, the motor 513 is rotated by a predetermined amount so as to reduce the adjustment of the convergence value by a predetermined amount (S705). In more detail, the motor 513 is rotated so that the movable frame 502 is moved a predetermined distance closer to the motor 513 in the vertical direction. The microcomputer 116 then obtains the output value of the A/D convertor 115 as the measurement Q (S706).

As in the preceding embodiments, if the measurement Q has fallen below the measurement P (S707:Yes), the processing for adjusting the convergence in the vertical direction is complete. If not (S707:No), the motor 513 is rotated so that the vertical adjustment by the convergence adjusting mechanism 151 is repeated (S708, S705).

Once the adjustment of convergence in the vertical direction has been completed, the processing advances to the flowchart in FIG. 30. The processing in FIG. 30 only differs from that in FIG. 29 by using pattern H in place of pattern B (S709) and in performing adjustment in the horizontal direction instead of the vertical direction (S710, S712). Accordingly, this processing will not be described in detail. It should be obvious here that the convergence in the horizontal direction is adjusted by rotating the motors 511 and 512 by the same amount. When the adjustment of convergence in the horizontal direction has been completed, the automatic adjustment of the projection parameters in the present embodiment ends.

As with the preceding embodiments, the present embodiment has the advantages of lower cost and of easier operation for adjustment of the projection parameters over systems where a video camera is used. Note that while steps S703 and S710 are described in the present embodiment as using initial settings of the maximum values for the convergence values, and steps S705 and S712 as decreasing these settings by predetermined amounts, the opposite may be the case, so that the minimum values may be initially set and the settings thereafter progressively increased by predetermined amounts. The widths of the stripes in pattern B and pattern H may also be changed.

The present embodiment describes the case where convergence is adjusted in the vertical and horizontal directions, although a rotational adjustment of the light valves may be performed using a different standard pattern. This rotation of a light valve can be easily achieved by having motors 511 and 512 rotate by different amounts.

Modifications

The present invention has been described by way of the preceding embodiments, although it should not be construed as being limited to the specific examples used therein. Example modifications of these embodiments are given below.

(1) The above embodiments all describe the case when the projection parameters such as the zoom ratio of the projection lens, the focus of the projection lens, the foci of the light valves, and the convergences of the light valves are all separately adjusted. However, since the various adjusting mechanisms (the projection lens magnification ratio adjusting mechanism, the projection lens focus adjusting mechanism, the light valve position/inclination adjusting mechanisms, the convergence adjusting mechanisms etc.) described in these embodiments can all be provided in the same projector, automatic adjustment of some or all of such projection parameters can be performed by the same projector.

Note that the provision of both the light valve position/inclination adjusting mechanism 141 and the convergence adjusting mechanism 151 can be easily achieved by attaching the fixed frame 401 shown in FIG. 16 not to the case of the projector but to the fixed frame 501 in FIG. 27 via an elastic body.

When a number of projection parameters are automatically adjusted for one projector, there are no particular restrictions regarding the order in which such projection parameters are adjusted. However, seeing as the technical effect of the present invention lies in the adjustment of projection parameters based on the detection amount of light reflected back off the screen, it would normally be preferable for the focus of the projection lens or the foci of the light valves to be adjusted before the other projection parameters. Since the automatic adjustment of the convergence will generally require a higher degree of precision than the other projection parameters, it will often be best for this adjustment to be performed after the adjustment of the other projection parameters is the for the most part complete.

When automatically adjusting a number of projection parameters, there is a possibility that the adjustment of one projection parameter will result in a previously adjusted projection parameter no longer being set at an optimal value. As a result, the adjustment of the projection parameters need not be limited to being performed once for each parameter, so that adjustment may be repeated a suitable number of times. The optimal order in which the projection parameters should be adjusted and the number of times adjustment is performed for each will depend on the operating conditions and the specific needs of users, and so are not subject to any particular limitations. Accordingly, an optimal arrangement for such conditions and needs may be used.

(2) The preceding embodiments describe the case when liquid crystal panels are used as the light valves 108~110, although this is not a limitation for the present invention. From the gist of the present invention, any kind of light valve that allows light reflected back off the screen to pass may be used. The present invention can also be adapted to use reflective light valves that use DIGITAL MICROMIRROR DEVICES (DMD) (a registered trademark of TEXAS INSTRUMENTS, INC.) or the like.

(3) The preceding embodiments were described using the example of a three-chip projector where a light splitting means with the construction in FIG. 2 is used. However, the light splitting means is not limited to this construction, so that a variety of different structures may be used. As one example, the present invention can be easily adapted to use dichroic prisms.

(4) The preceding embodiments gave no particular details regarding the adjustment of convergence between the light valves for the three RGB colors, although since the described method uses two projectors, one projector that has had the convergence between the RGB colors precisely adjusted can be used as the standard for adjusting the other projector, so that no detailed explanation should be required. It should be obvious that it is also preferable for the convergence between the different light valves to be adjusted when automatically adjusting the projection parameters.

(5) In the preceding embodiments, the processing, such as in the flowchart of FIG. 3, is such that the adjustment is terminated when the measurement Q falls below the measurement P. However, the present invention is not limited to this, and a variety of different control processes may be performed to make the adjustments more precise. As one example, the intensity of the reflected light before and after the measurement Q falls below the measurement P may be detected and stored, thereby enabling the most suitable adjustment of the projection parameters to be made.

(6) Finally, in the above embodiments, the projection parameters are described as being adjusted based on the intensity of the reflected light that is detected by the light detecting element 114. However, the present invention is not limited to this, so that if a CCD (Charge Coupled Device) is used as the light detecting element 114, the projection parameters may be adjusted having detected the form of the image that reaches the light detecting element 114 or the colors in such image.

Although the present invention has been fully described by way of examples with reference to accompanying drawings, it is to be noted that various changes and modifications will be apparent to those skilled in the art. Therefore, unless such changes and modifications depart from the scope of the present invention, they should be construed as being included therein.

What is claimed is:

1. A projector, comprising:
   a light source that can be freely switched on and off;
   light splitting means for splitting light from the light source, when switched on, into three colors red, green, and blue;
   three light valves, each of which is incident to light of a different one of the three colors red, green and blue, which each forms an image according to an inputted image signal;
   light combining means for combining light that has passed the three light valves;
   a projection lens for projecting the light combined by the light combining means to form an image on a screen;
   reflected light intensity detecting means for detecting an intensity of light that has been reflected off the screen and back through the projection lens and at least one of the three light valves; and
   control means for controlling the three light valves to display predetermined patterns and having a projection parameter adjusted according to the intensity detected by the reflected light intensity detecting means.

2. The projector of claim 1,
   wherein the control means has the projection parameter adjusted so that the intensity detected by the reflected light intensity detecting means reaches a highest value.

3. The projector of claim 1, wherein the reflected light intensity detecting means includes:
   a light detecting element for receiving the reflected light and outputting a signal showing the intensity of the reflected light to the control means; and
   a half mirror, located between the light source and the light splitting means on an optical path taken by the light from the light source, that allows the light from the light source to pass and directs the reflected light toward the light detecting element.

4. The projector of claim 3,
   wherein the light detecting element is a photo diode, and the reflected light intensity detecting means further includes a collective lens, positioned between the half mirror and the light detecting element, for collecting light reflected by the half mirror.

5. The projector of claim 1,
   wherein the reflected light intensity detecting means includes:
   a light detecting element for receiving the reflected light and outputting a signal showing the intensity of the reflected light to the control means; and
   a mirror, disposed so as to be movable between a first position that is situated on an optical path taken by the light from the light source and a second position that is away from the optical path, for directing the reflected light toward the light detecting element when positioned in the first position.

6. The projector of claim 5, wherein the light detecting element is a photo diode, and the reflected light intensity detecting means further includes a collective lens, positioned between the mirror and the light detecting element, for collecting light reflected by the mirror.

7. A projector that projects images onto a screen by passing light from a light source through a light valve and a projection lens, the projector comprising:

reflected light detecting means for detecting light that has been reflected off the screen and back through the light valve;

projection parameter adjusting means for adjusting a projection parameter based on a detection result of the reflected light detecting means; and pattern projecting means for controlling the light valve to display a predetermined pattern and switching on the light source to have an image of the predetermined pattern projected onto the screen, wherein the reflected light detecting means detects an intensity of the light that has been reflected off the screen and back through the light valve, and the projection parameter adjusting means adjusts the projection parameter based on the intensity detected by the reflected light detecting means.

8. The projector of claim 7, wherein the reflected light detecting means includes:

a collective lens for collecting the light that has been reflected off the screen and back through the light valve, a light detecting element that detects an intensity of the light that has been collected by the collective lens; and a half mirror, located on an optical path taken by the light from the light source, that allows the light from the light source to pass and directs the light that has been reflected off the screen and back through the light valve toward the collective lens.

9. The projector of claim 7, wherein an outer part of the predetermined pattern allows light to pass, and the projection parameter adjusting means adjusts a zoom ratio of a projection lens so that the intensity detected by the reflected light detecting means reaches a highest value.

10. The projector of claim 7, wherein the predetermined pattern includes bright areas adjacent to dark areas, and the projection parameter adjusting means adjusts a focus of a projection lens so that the intensity detected by the reflected light detecting means reaches a highest value.

11. The projector of claim 7, wherein the pattern projecting means has a plurality of predetermined patterns successively formed on the light valve, each of the plurality of predetermined patterns having a region where bright areas are adjacent to dark areas located in a different position to other predetermined patterns, wherein the projector further comprises:

position/inclination measurement obtaining means for obtaining, from the intensity detected by the reflected light detecting means, a measurement relating to a position and an inclination of the light valve separately for each of the plurality of predetermined patterns; and position/inclination calculating means for calculating information that shows an optimal position and inclination of the light valve, based on the measurements obtained for each of the plurality of patterns by the position/inclination measurement obtaining means, wherein the projection parameter adjusting means adjusts the position and the inclination of the light valve based on the information calculated by the position/inclination calculating means.

12. The projector of claim 7, wherein the predetermined pattern includes bright areas adjacent to dark areas, and the projection parameter adjusting means adjusts a position of the light valve along an optical path of light from the light source so that the intensity detected by the reflected light detecting means reaches a highest value.

13. A projector that projects images onto a screen by passing light from a light source through a light valve and a projection lens, the projector comprising:

reflected light detecting means for detecting light that has been reflected off the screen and back through the light valve;

projection parameter adjusting means for adjusting a projection parameter based on a detection result of the reflected light detecting means; and pattern forming means for controlling the light valve to display a predetermined pattern, the predetermined pattern being similar to a pattern projected onto the screen by a different projector, wherein the reflected light detecting means includes:

reflected light collecting means for collecting the light that has been reflected off the screen and has passed through the light valve; and reflected light measuring means for measuring an intensity of the reflected light that has been collected by the reflected light collecting means, wherein the projection parameter adjusting means adjusts the projection parameter based on the intensity detected by the reflected light measuring means.

14. The projector of claim 13, wherein the reflected light collecting means includes:

a collective lens for collecting the reflected light that has been reflected off the screen and has passed through the light valve; and a mirror, disposed so as to be movable between a first position that is situated on an optical path of the light from the light source and a second position that is away from the optical path, for directing the reflected light toward the collective lens when positioned in the first position.

15. The projector of claim 13, wherein an outer part of the pattern on the screen is bright, and the projection parameter adjusting means adjusts a zoom ratio of a projection lens so that the intensity detected by the reflected light measuring means reaches a highest value.

16. The projector of claim 13, wherein the pattern on the screen has alternating bright areas and dark areas arranged in a vertical direction, and the projection parameter adjusting means adjusts an axis displacement of a projection lens so that the intensity detected by the reflected light measuring means reaches a highest value.

17. The projector of claim 13, wherein the pattern on the screen has alternating bright areas and dark areas arranged in a horizontal direction, and the projection parameter adjusting means adjusts a convergence of the light valve in the horizontal direction so that the intensity detected by the reflected light measuring means reaches a highest value.

18. The projector of claim 13, wherein the pattern on the screen has alternating bright areas and dark areas arranged in a vertical direction, and the projection parameter adjusting means adjusts a convergence of the light valve in the vertical direction so that the intensity detected by the reflected light measuring means reaches a highest value.

19. A projector that projects images onto a screen by passing light from a light source through a light valve and a projection lens, the projector comprising:

pattern projecting means for controlling the light valve to display a predetermined pattern to have an image of the predetermined pattern projected onto the screen; and reflected light detecting means for detecting light from the predetermined pattern that has been reflected off the screen and back through the light valve provide a detection output to enable an adjustment of the projector.

* * * * *